US008897363B2

(12) United States Patent
Jung et al.

(10) Patent No.: US 8,897,363 B2
(45) Date of Patent: *Nov. 25, 2014

(54) METHOD AND APPARATUS FOR ENCODING VIDEO IN CONSIDERATION OF SCANNING ORDER OF CODING UNITS HAVING HIERARCHICAL STRUCTURE, AND METHOD AND APPARATUS FOR DECODING VIDEO IN CONSIDERATION OF SCANNING ORDER OF CODING UNITS HAVING HIERARCHICAL STRUCTURE

(71) Applicant: Samsung Electronics Co., Ltd., Suwon-si (KR)

(72) Inventors: Hae-kyung Jung, Seoul (KR); Min-su Cheon, Suwon-si (KR); Jung-hye Min, Suwon-si (KR); Il-koo Kim, Osan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,454

(22) Filed: Feb. 3, 2014

(65) Prior Publication Data

US 2014/0146880 A1    May 29, 2014

Related U.S. Application Data

(60) Continuation of application No. 13/975,802, filed on Aug. 26, 2013, now Pat. No. 8,644,385, which is a division of application No. 12/856,028, filed on Aug. 13, 2010, now Pat. No. 8,532,185.

(30) Foreign Application Priority Data

Aug. 14, 2009    (KR) ......................... 10-2009-0075432

(51) Int. Cl.
H04N 7/12          (2006.01)
H04N 19/147        (2014.01)

(Continued)

(52) U.S. Cl.
CPC ... *H04N 19/00109* (2013.01); *H04N 19/00175* (2013.01); *H04N 19/0003* (2013.01);

(Continued)

(58) Field of Classification Search
None
See application file for complete search history.

(56) References Cited

U.S. PATENT DOCUMENTS 8,532,185 B2    9/2013   Jung et al.
8,634,456 B2 *  1/2014   Chen et al. .................... 375/240

(Continued)

FOREIGN PATENT DOCUMENTS

CA    2 738 037 A1    4/2010
JP    2003-319394 A   11/2003

(Continued)

OTHER PUBLICATIONS

International Search Report issued on Apr. 14, 2011 in the corresponding International Patent Application No. PCT/KR2010/005373 [PCT/ISA/210].

(Continued)

*Primary Examiner* — Sath V Perungavoor
*Assistant Examiner* — Dakshesh Parikh
(74) *Attorney, Agent, or Firm* — Sughrue Mion, PLLC

(57) ABSTRACT

A method and apparatus for decoding a video and a method and apparatus for encoding a video are provided. The method for decoding the video includes: receiving and parsing a bitstream of an encoded video; extracting, from the bitstream, encoded image data of a current picture of the encoded video assigned to a maximum coding unit, and information about a coded depth and an encoding mode according to the maximum coding unit; and decoding the encoded image data for the maximum coding unit based on the information about the coded depth and the encoding mode for the maximum coding unit, in consideration of a raster scanning order for the maximum coding unit and a zigzag scanning order for coding units of the maximum coding unit according to depths.

3 Claims, 21 Drawing Sheets

(51) Int. Cl.

| | | |
|---|---|---|
| *H04N 19/107* | (2014.01) | |
| *H04N 19/132* | (2014.01) | |
| *H04N 19/593* | (2014.01) | |
| *H04N 19/129* | (2014.01) | |
| *H04N 19/196* | (2014.01) | |
| *H04N 19/187* | (2014.01) | |
| *H04N 19/176* | (2014.01) | |
| *H04N 19/51* | (2014.01) | |
| *H04N 19/167* | (2014.01) | |
| *H04N 19/119* | (2014.01) | |
| *H04N 19/50* | (2014.01) | |
| *H04N 19/88* | (2014.01) | |
| *H04N 19/157* | (2014.01) | |
| *H04N 19/122* | (2014.01) | |
| *H04N 19/61* | (2014.01) | |

(52) U.S. Cl.
CPC ... *H04N 19/00127* (2013.01); *H04N 19/00763* (2013.01); *H04N 19/00381* (2013.01); *H04N 19/00321* (2013.01); *H04N 19/00278* (2013.01); *H04N 19/00696* (2013.01); *H04N 19/00248* (2013.01); *H04N 19/00072* (2013.01); *H04N 19/00569* (2013.01); *H04N 19/00927* (2013.01); *H04N 19/00212* (2013.01); *H04N 19/00084* (2013.01); *H04N 19/00781* (2013.01)
USPC .................................................. 375/240.12

(56) References Cited

U.S. PATENT DOCUMENTS

| | | | |
|---|---|---|---|
| 8,634,465 | B2 | 1/2014 | Jung et al. |
| 2007/0177813 | A1* | 8/2007 | Yang .............................. 382/233 |
| 2008/0043831 | A1* | 2/2008 | Sethuraman et al. ......... 375/240 |
| 2009/0141803 | A1 | 6/2009 | Marpe et al. |
| 2010/0020871 | A1* | 1/2010 | Hannuksela et al. .... 375/240.12 |
| 2010/0086029 | A1* | 4/2010 | Chen et al. ............... 375/240.12 |

FOREIGN PATENT DOCUMENTS

| | | | |
|---|---|---|---|
| KR | 10-2011-0010324 A | | 2/2011 |
| KR | 10-2011-0017301 A | | 2/2011 |
| KR | 10-2011-0017302 A | | 2/2011 |
| WO | 2004/104930 A2 | | 12/2004 |
| WO | 2007/063612 A1 | | 6/2007 |
| WO | 2009/051719 A2 | | 4/2009 |

OTHER PUBLICATIONS

Notification of Transmittal for PCT/KR2010/005373 [PCT/ISA/220].

Written Opinion for PCT/KR2010/005373 [PCT/ISA/237].

Communication, dated Dec. 23, 2013, issued by the Canadian Intellectual Property Office in counterpart Canadian Patent Application No. 2,768,693.

Communication dated Apr. 23, 2014, issued by the Mexican Patent Office in counterpart Mexican Application No. MX/a/2013/013716.

Communication dated Apr. 23, 2014, issued by the Mexican Patent Office in counterpart Mexican Application No. MX/a/2013/013712.

Communication dated May 20, 2014, issued by the Japanese Patent Office in counterpart Japanese Application No. 2012-524659.

Naito, et al.; "Efficient Coding Scheme for Super High Definition Video Based on Extending H.264 High Profile", Video Communications and Image Processing, Jan. 17-19, 2006, vol. 6077, Pt. 2, pp. 1-8.

Chujoh, et al; "Specification and Experimental Results of Quadtree-based Adaptive Loop Filter", ITU-Telecommunications Standardization Sector, Study Group 16, Question 6, Video Coding Experts Group (VCEG), 37th Meeting: Yokohama, Japan, Apr. 15-18, 2009, pp. 1-11.

Yamamoto, et al.; "Analysis on Transform and Partition Selection in Extended Block Sizes and Modification of Block Transforms", ITU-Telecommunications Standardization Sector, Study Group 16, Question 6, Video Coding Experts Group (VCEG), 37th Meeting: Yokohama, Japan, Apr. 15-18, 2009, pp. 1-5.

Kim, et al "Enlarging MB Size for High Fidelity Video Coding Beyond HD", ITU-Telecommunications Standardization Sector, Study Group 16, Question 6, Video Coding Experts Group (VCEG), 36th Meeting: San Diego USA, Oct. 8-10, 2008, pp. 1-6.

\* cited by examiner

FIG. 7
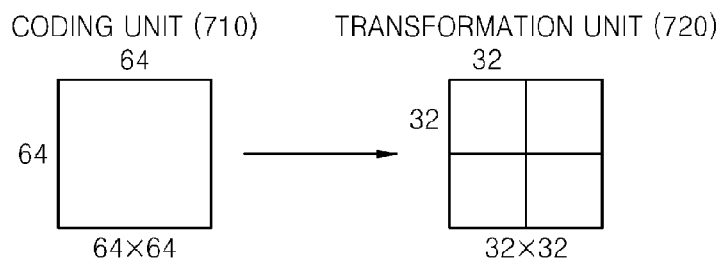
FIG. 8
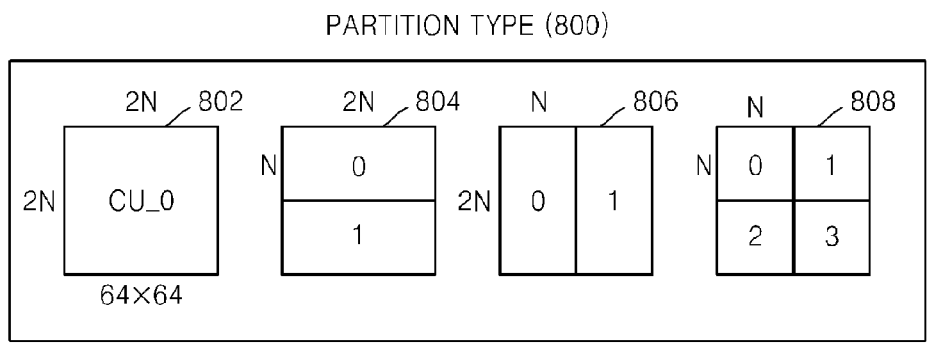
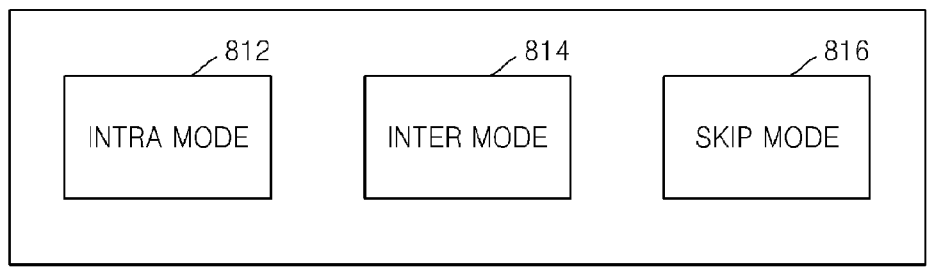
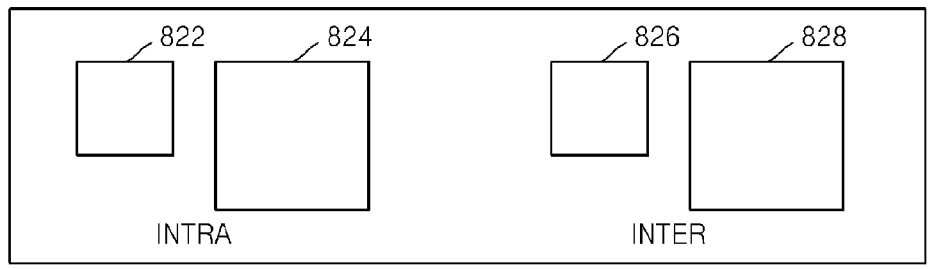

CODING UNITS (1010)

METHOD AND APPARATUS FOR ENCODING VIDEO IN CONSIDERATION OF SCANNING ORDER OF CODING UNITS HAVING HIERARCHICAL STRUCTURE, AND METHOD AND APPARATUS FOR DECODING VIDEO IN CONSIDERATION OF SCANNING ORDER OF CODING UNITS HAVING HIERARCHICAL STRUCTURE

CROSS-REFERENCE TO RELATED PATENT APPLICATIONS

This is a Continuation application of U.S. application Ser. No. 13/975,802, filed Aug. 26, 2013, which is a Divisional application of U.S. application Ser. No. 12/856,028, filed Aug. 13, 2010, which claims the benefit of Korean Patent Application No. 10-2009-0075432, filed on Aug. 14, 2009, in the Korean Intellectual Property Office, the disclosures of which are incorporated herein in their entirety by reference.

BACKGROUND OF THE INVENTION

1. Field of the Invention

The present invention relates to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size. In addition, in a related art video codec, video data is encoded and decoded by scanning macroblocks according to a raster method.

SUMMARY

Apparatuses and methods consistent with exemplary embodiments provide a data scanning order associated with encoding and decoding of videos, and a neighboring relationship between data.

According to an aspect of an exemplary embodiment, there is provided a method of decoding a video, the method including: receiving and parsing a bitstream of an encoded video; extracting, from the bitstream, encoded image data of a current picture of the encoded video assigned to a maximum coding unit of the current picture, and information about a coded depth and an encoding mode according to the maximum coding unit, wherein the maximum coding unit is a coding unit of the current picture having a maximum size; and decoding the encoded image data for the maximum coding unit based on the information about the coded depth and the encoding mode for the maximum coding unit, in consideration of a raster scanning order for the maximum coding unit and a zigzag scanning order for coding units of the maximum coding unit according to depths, wherein the maximum coding unit is spatially split into at least one coding unit according to at least one depth, and as a depth deepens from an uppermost depth, the maximum coding unit is hierarchically split from the maximum coding unit corresponding to the uppermost depth to at least one minimum coding unit corresponding to a lowermost depth of the at least one depth, wherein the at least one coding unit is a deeper coding unit.

The decoding the encoded image data may include analyzing a hierarchical structure of at least one deeper coding unit for the maximum coding unit by using the information about the coded depth and the encoding mode for the maximum coding unit.

The decoding the encoded image data may include searching for a location of the maximum coding unit, based on an address of the maximum coding unit according to the raster scanning order.

The decoding the encoded image data may include searching for a location of a minimum unit, based on an index of the minimum unit according to a zigzag scanning order for the maximum coding unit.

The decoding the encoded image data may include searching for a location of a minimum unit, based on an index of the minimum unit according to a raster scanning order for the maximum coding unit.

The decoding the encoded image data may include mutually transforming an index of a minimum unit according to a zigzag scanning order and an index of the minimum unit according to a raster scanning order to each other, for the maximum coding unit.

A location of the maximum coding unit may be expressed as a location of a pixel located on a left upper end of the maximum coding unit that is relative to a location of a sample located on a left upper end of the current picture.

A location of a minimum unit may be expressed as a location of a pixel located on a left upper end of the minimum unit that is relative to a location of a sample located on a left upper end of the maximum coding unit.

In the decoding the encoded image data, neighborhood information may be referred to by checking usability of the neighborhood information, in consideration of a scanning order of the maximum coding unit, a prediction unit, a partition, and a minimum unit.

The decoding the encoded image data may include checking usability of the maximum coding unit.

In a case other than a case where the maximum coding unit is not included in the current picture, a case where the maximum coding unit is not included in a current slice, and a case where an address of the maximum coding unit is later than an address of a current maximum coding unit in terms of a scanning order, data corresponding to the maximum coding unit may be used.

The decoding the encoded image data may include checking usability of at least one deeper coding unit included in the maximum coding unit.

In a case other than a case where the maximum coding unit is not included in the current picture, a case where the maximum coding unit is not included in a current slice, a case where an address of the maximum coding unit is later than an address of a current maximum coding unit in terms of a scanning order, and a case where an index of a minimum unit on a left upper side of a deeper coding unit according to a zigzag scanning order is later in terms of a scanning order than an index of the minimum unit according to a zigzag scanning order, data corresponding to the deeper coding unit may be used.

The decoding the encoded image data may include checking at least one maximum coding unit adjacent to the maximum coding unit and usability of the at least one adjacent maximum coding unit.

The at least one maximum coding unit adjacent to the maximum coding unit may include at least one of a maximum coding unit on a left side of the maximum coding unit, a maximum coding unit on an upper side of the maximum coding unit, a maximum coding unit on a right upper side of the maximum coding unit, and a maximum coding unit on a left upper side of the maximum coding unit.

The decoding the encoded image data may further include checking at least one minimum unit adjacent to a current prediction unit included in the maximum coding unit and usability of the at least one adjacent minimum unit.

The at least one minimum unit adjacent to the current prediction unit may include at least one of a minimum unit on a left side of the current prediction unit, a minimum unit on an upper side of the current prediction unit, a minimum unit on a right upper side of the current prediction unit, a minimum unit on a left upper side of the current prediction unit, and a minimum unit on a left lower side of the current prediction unit.

The decoding the encoded image data may further include checking a location and usability of at least one boundary adjacent to the maximum coding unit.

The at least one boundary adjacent to the maximum coding unit may include at least one of a maximum coding unit on a left side of the maximum coding unit, a maximum coding unit on an upper side of the maximum coding unit, a maximum coding unit on a right upper side of the maximum coding unit, and a maximum coding unit on a left upper side of the maximum coding unit.

The minimum unit may be assigned with encoding information including at least one of information about a corresponding deeper coding unit, information about splitting of the corresponding deeper coding unit into a prediction unit or a partition, and information about a prediction mode of the prediction unit or the partition.

The decoding the encoded image data may further include checking usability of a deeper coding unit or a prediction unit that includes the minimum unit, based on the encoding information assigned to the minimum unit.

The maximum coding unit may include a plurality of coding units, and when a first coding unit, of the plurality of coding units, which is adjacent to a second coding unit, of the plurality of coding units, is scanned later than the second coding unit according to a raster scanning order and the first coding unit is scanned earlier than the second coding unit according to a zigzag scanning order, the first coding unit may be referenced to decode the second coding unit.

When the first coding unit is on a left lower side of the second coding unit, the first coding unit may be referenced to decode the second coding unit.

When the first coding unit is on a left lower side of the second coding unit, a right boundary of the first coding unit may be referenced to decode the second coding unit.

According to an aspect of another exemplary embodiment, there is provided a method of encoding a video, the method including: splitting a current picture of the video into a maximum coding unit; determining a coded depth to output a final encoding result according to at least one split region obtained by splitting a region of the maximum coding unit according to depths, by encoding the at least one split region, based on at least one depth that deepens in proportion to a number of times that the region of the maximum coding unit is split; and encoding and outputting image data encoded at a coded depth determined for the maximum coding unit, and information about the coded depth and an encoding mode, wherein the encoding is performed in consideration of a raster scanning order for the maximum coding unit and a zigzag scanning order for at least one coding unit included in the maximum coding unit.

In the method, neighborhood information including a data unit located on a left lower side of a current data unit may be referenced to encode image data corresponding to the current data unit.

The neighborhood information may include a maximum coding unit on a left side of the maximum coding unit, a maximum coding unit on an upper side of the maximum coding unit, a maximum coding unit on a right upper side of the maximum coding unit, and a maximum coding unit on a left upper side of the maximum coding unit.

The neighborhood information may include a minimum unit on a left side of a current prediction unit, a minimum unit on an upper side of the current prediction unit, a minimum unit on a right upper side of the current prediction unit, a minimum unit on a left upper side of the current prediction unit, and a minimum unit on a left lower side of the current prediction unit.

The neighborhood information may include a right boundary of a coding unit located on the left lower side of the current prediction unit.

The maximum coding unit may include a plurality of coding units, and when a first coding unit, of the plurality of coding units, which is adjacent to a second coding unit, of the plurality of coding units, is scanned later than the second coding unit according to a raster scanning order and the first coding unit is scanned earlier than the second coding unit according to a zigzag scanning order, the first coding unit may be used as neighborhood information which is used to encode the second coding unit.

The first coding unit may be on a left lower side of the second coding unit.

According to an aspect of another exemplary embodiment, there is provided an apparatus for decoding a video, the apparatus including: a receiver which receives and parses a bitstream of an encoded video; an image data and encoding information extractor which extracts, from the bitstream, encoded image data of a current picture of the encoded video assigned to a maximum coding unit of the current picture, and information about a coded depth and an encoding mode according to the maximum coding unit, wherein the maximum coding unit is a coding unit of the current picture having a maximum size; and an image data decoder which decodes the encoded image data for the maximum coding unit based on the information about the coded depth and the encoding mode for the maximum coding unit, in consideration of a raster scanning order for the maximum coding unit and a zigzag scanning order for coding units according to depths, wherein as a depth deepens from an uppermost depth, the maximum coding unit is hierarchically split from the maximum coding unit corresponding to the uppermost depth to minimum coding units corresponding to a lowermost depth.

According to an aspect of another exemplary embodiment, there is provided an apparatus for encoding a video, the apparatus including: a maximum coding unit splitter which splits a current picture of the video into a maximum coding unit; an coding unit determiner which determines a coded depth to output a final encoding result according to at least one split region obtained by splitting a region of the maximum coding unit according to depths, by encoding the at least one split region, based on a depth that deepens in proportion to a number of times that the region of the maximum coding unit is split; and an output unit which encodes and outputs image data encoded at a coded depth determined for the maximum coding unit, and information about the coded depth and an encoding mode, wherein the encoding is performed in consideration of a raster scanning order for the maximum coding unit and a zigzag scanning order for at least one coding unit included in the maximum coding unit.

According to an aspect of another exemplary embodiment, there is provided a computer readable recording medium having recorded thereon a program for executing the method of decoding a video.

According to an aspect of another exemplary embodiment, there is provided a computer readable recording medium having recorded thereon a program for executing the method of encoding a video.

According to an aspect of another exemplary embodiment, there is provided a method of decoding a video, the method including: extracting, from a bitstream, encoded image data of a current picture of the video assigned to a maximum coding unit of the current picture, and information about a coded depth according to the maximum coding unit, wherein the maximum coding unit is a coding unit of the current picture having a maximum size; and decoding the encoded image data for the maximum coding unit based on the information about the coded depth, in consideration of a raster scanning order for the maximum coding unit and a zigzag scanning order for coding units of the maximum coding unit according to depths, wherein the maximum coding unit is spatially split into at least one coding unit according to at least one depth, and as a depth deepens from an uppermost depth, the maximum coding unit is hierarchically split from the maximum coding unit corresponding to the uppermost depth to at least one minimum coding unit corresponding to a lowermost depth of the at least one depth, wherein the at least one coding unit is a deeper coding unit.

BRIEF DESCRIPTION OF THE DRAWINGS

The above and/or other aspects will become more apparent by describing in detail exemplary embodiments thereof with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION OF EXEMPLARY EMBODIMENTS

Figure 1:
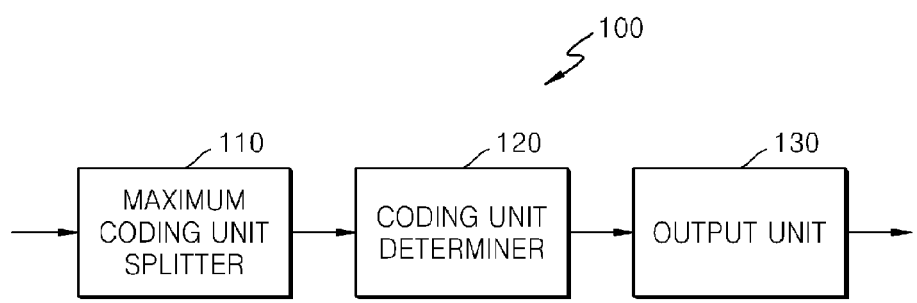
FIG. 1 is a block diagram of an apparatus for encoding a video, according to an exemplary embodiment.

Hereinafter, exemplary embodiments will be described more fully with reference to the accompanying drawings, in which like reference numerals refer to like elements throughout. Expressions such as "at least one of," when preceding a list of elements, modify the entire list of elements and do not modify the individual elements of the list.

Hereinafter, a coding unit is an encoding data unit in which the image data is encoded at an encoder side and an encoded data unit in which the encoded image data is decoded at a decoder side, according to exemplary embodiments. Also, a coded depth indicates a depth where a coding unit is encoded.

Hereinafter, an 'image' may denote a still image for a video or a moving image, that is, the video itself.

FIG. 1 is a block diagram of a video encoding apparatus 100, according to an exemplary embodiment. Referring to FIG. 1, the video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit. Accordingly, as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into one or more maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. For example, the coding unit determiner 120 determines a coded depth by encoding the image data in the deeper coding units according to depths, according to the maximum coding unit of the current picture, and selecting a depth having the least encoding errors. Thus, the encoded image data of the coding unit corresponding to the determined coded depth is output by the coding unit determiner 120. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding errors may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split to regions according to the depths and the encoding errors may differ according to regions in the one maximum coding unit. Thus, the coded depths may differ according to regions in the image data. Therefore, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of splitting times from a maximum coding unit to a minimum coding unit. A first maximum depth according to an exemplary embodiment may denote a total number of splitting times from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist. In this case, the first maximum depth may be set to 4, and the second maximum depth may be set to 5.

Prediction encoding and transformation may be performed according to the maximum coding unit. The prediction encoding and the transformation may also be performed based on the deeper coding units according to a depth equal to, or depths less than, the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation may be performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform the prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for the prediction encoding will now be referred to as a prediction unit. A partition obtained by splitting the prediction unit may include a prediction unit or a data unit obtained by splitting at least one of a height and a width of the prediction unit.

For example, when a coding unit of a size of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or the width of the prediction unit (such as 1:n or n:1), partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on prediction units in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will hereinafter be referred to as a transformation unit. A transformation depth indicating a number of splitting times to reach the transformation unit by splitting a height and a width of the coding unit may also be set for the transformation unit. For example, in a current coding unit of 2N×2N, a transformation depth may be 0 when a size of a transformation unit is also 2N×2N, may be 1 when each of the height and the width of the current coding unit is split into two equal parts, totally split into 4^1 transformation units, and the size of the transformation unit is thus N×N, and may be 2 when each of the height and the width of the current coding unit is split into four equal parts, totally split into 4^2 transformation units, and the size of the transformation unit is thus N/2×N/2. For example, the transformation unit may be set according to a hierarchical tree structure, in which a transformation unit of an upper transformation depth is split into four transformation units of a lower transformation depth according to hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth uses not only information about the coded depth, but also information about information related to prediction encoding and transformation. Accordingly, the coding unit determiner 120 not only determines a coded depth having a minimum encoding error, but also determines a partition type in a prediction unit, a prediction mode according to prediction units, and a size of a transformation unit for transformation.

Coding units according to a tree structure in a maximum coding unit and a method of determining a partition, according to one or more exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams. The encoded image data may be obtained by encoding residual data of an image. The information about the encoding mode according to coded depth may include at least one of information about the coded depth, information about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth. Thus, the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth. Thus, the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths. Thus, information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment may be a rectangular data unit obtained by splitting the minimum coding unit having the lowermost depth by 4. Alternatively, the minimum unit may be a maximum-size rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include at least one of information about the prediction mode and information about a size of the partitions. The encoding information according to the prediction units may include at least one of information about an estimated direction of an inter mode, information about a reference image index of the inter mode, information about a motion vector, information about a chroma component of an intra mode, and information about an interpolation method of the intra mode. Also, information about a maximum size of the coding unit defined according to pictures, slices, or groups of pictures (GOPs), and information about a maximum depth may be inserted into a Sequence Parameter Set (SPS) or a header of a bitstream.

In the video encoding apparatus 100, the deeper coding unit may be a coding unit obtained by dividing at least one of a height and a width of a coding unit of an upper depth, which is one layer above, by two. In other words, when the size of the coding unit of the current depth is 2N×2N, the size of the coding unit of the lower depth may be N×N. Also, the coding unit of the current depth having the size of 2N×2N may include 4 of the coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth both determined considering characteristics of the current picture. Also, since encoding may be performed on each maximum coding unit by using any of various prediction modes and transformations, an optimum encoding mode may be determined considering characteristics of the coding unit of various image sizes.

Thus, if an image having a high resolution or a large amount of data is encoded in units of related art macroblocks, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image while increasing a maximum size of a coding unit while considering a size of the image.

Figure 2:
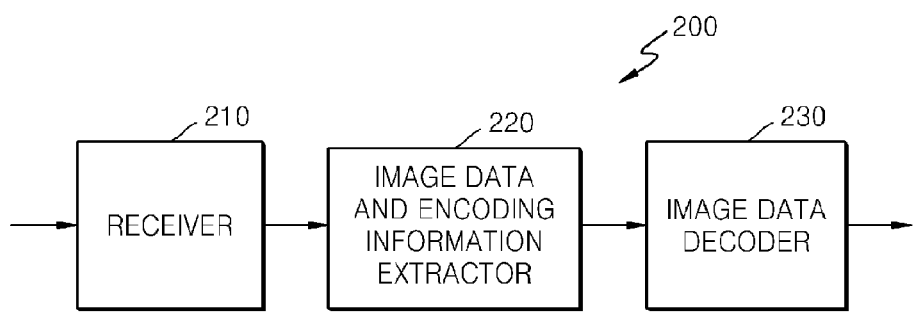
FIG. 2 is a block diagram of an apparatus for decoding a video, according to an exemplary embodiment.

FIG. 2 is a block diagram of a video decoding apparatus 200, according to an exemplary embodiment of the present invention. Referring to FIG. 2, the video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are the same or similar to those described above with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header corresponding to the current picture or an SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. Thus, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth. Furthermore, the information about the encoding mode may include at least one of information about a partition type of a corresponding coding unit corresponding to the coded depth, information about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include at least one of a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units including the encoding information including the same split information may be gathered by observing the encoding information set assigned for the predetermined data unit from among the coding unit, the prediction unit, and the minimum unit. Moreover, the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, a maximum size of the coding unit may be determined considering resolution and an amount of image data.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to one or more exemplary embodiments will now be described with reference to FIGS. 3 through 13.

Figure 3:
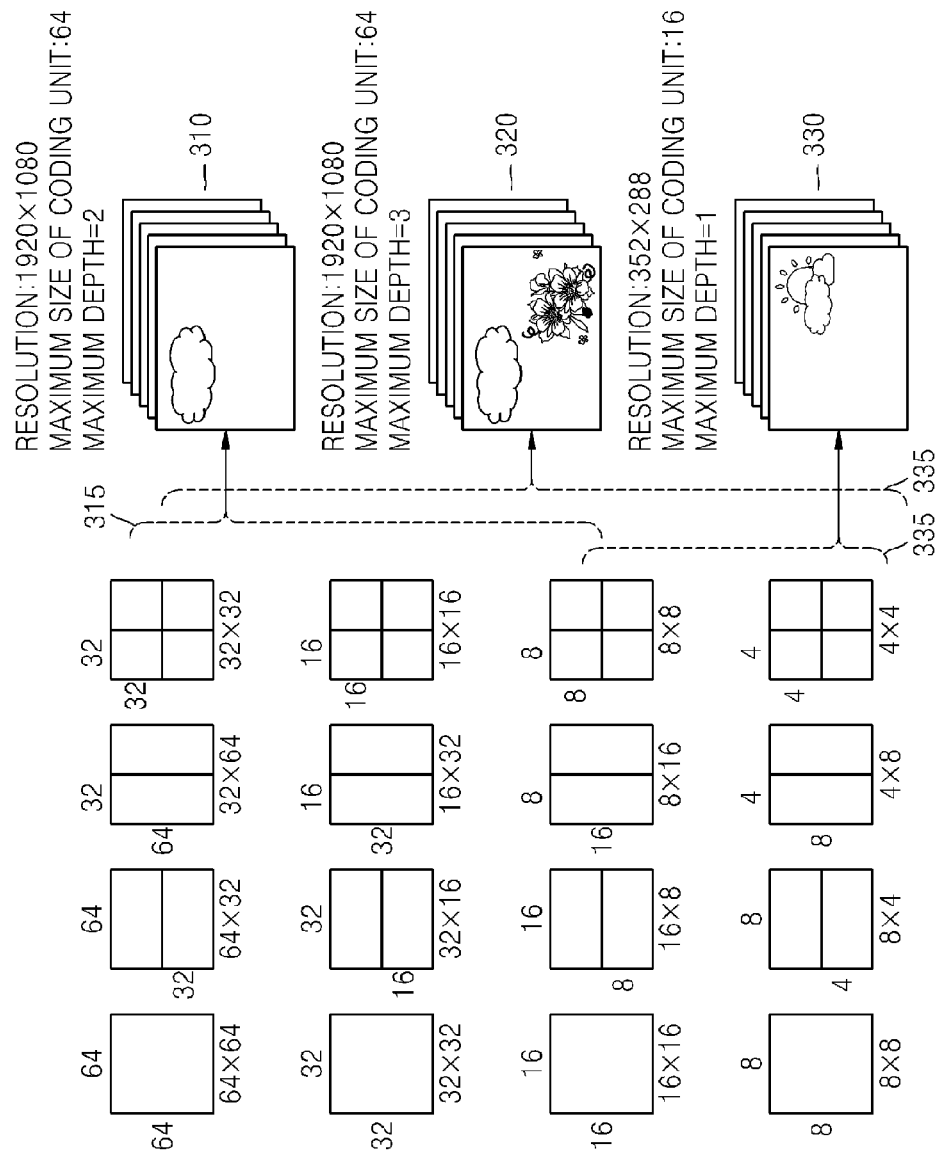
FIG. 3 is a diagram for describing a concept of coding units according to an exemplary embodiment.

FIG. 3 is a diagram for describing a concept of coding units according to an exemplary embodiment. A size of a coding unit may be expressed in width×height, and may be 64×64, 32×32, 16×16, and 8×8, though it is understood that another exemplary embodiment is not limited thereto. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

Referring to FIG. 3, first video data 310 has a resolution of 1920×1080, a maximum size of a coding unit of 64, and a maximum depth of 2. Second video data 320 has a resolution of 1920×1080, a maximum size of a coding unit of 64, and a maximum depth of 3. Third video data 330 has a resolution of 352×288, a maximum size of a coding unit of 16, and a maximum depth of 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding units of the first and second video data 310 and 320 having a higher resolution than the third video data 330 may be 64.

Since the maximum depth of the first video data 310 is 2, coding units 315 of the first video data 310 may include a maximum coding unit having a long axis size of 64, and coding units having long axis sizes of 32 and 16 since depths are deepened to two layers by splitting the maximum coding unit twice. Meanwhile, since the maximum depth of the third video data 330 is 1, coding units 335 of the third video data 330 may include a maximum coding unit having a long axis size of 16, and coding units having a long axis size of 8 since depths are deepened to one layer by splitting the maximum coding unit once.

Since the maximum depth of the second video data 320 is 3, coding units 325 of the second video data 320 may include a maximum coding unit having a long axis size of 64, and coding units having long axis sizes of 32, 16, and 8 since the depths are deepened to 3 layers by splitting the maximum coding unit three times. As a depth deepens (i.e., increases), detailed information may be precisely expressed.

Figure 4:
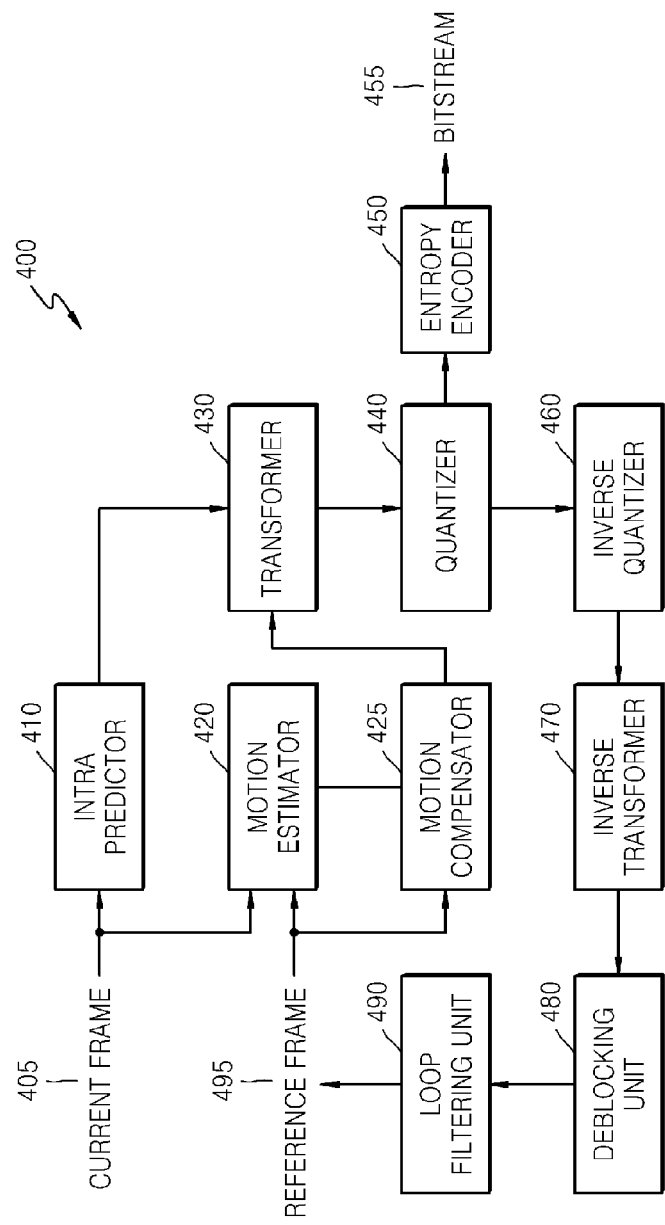
FIG. 4 is a block diagram of an image encoder based on coding units according to an exemplary embodiment.

FIG. 4 is a block diagram of an image encoder 400 based on coding units, according to an embodiment of the present invention. Referring to FIG. 4, the image encoder 400 performs operations of the coding unit determiner 120 of the video encoding apparatus 100 to encode image data. For example, an intra predictor 410 performs intra prediction on coding units in an intra mode, from among a current frame 405, and a motion estimator 420 and a motion compensator 425 perform inter estimation and motion compensation, respectively, on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470. The restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering a maximum size and a maximum depth of a current maximum coding unit, and the transformer 430 determines a size of the transformation unit in each coding unit from among the coding units having a tree structure.

Figure 5:
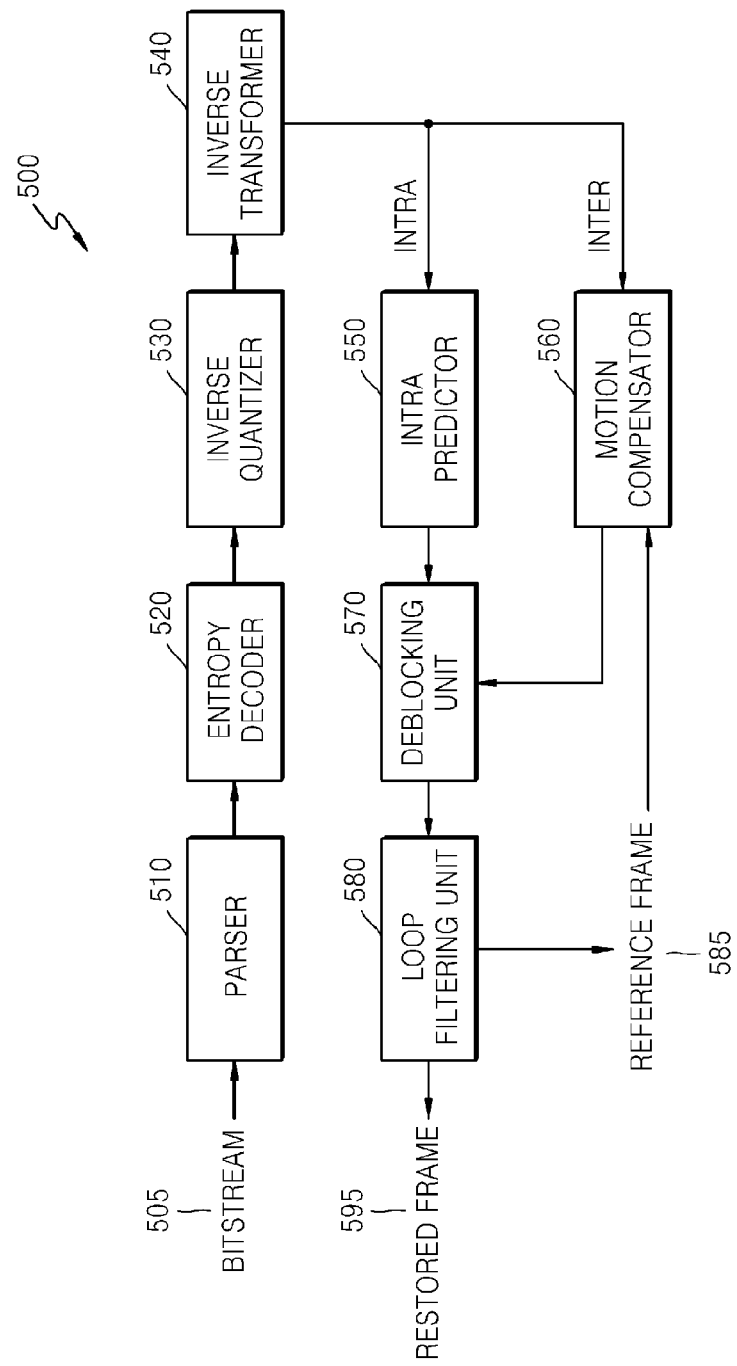
FIG. 5 is a block diagram of an image decoder based on coding units according to an exemplary embodiment.

FIG. 5 is a block diagram of an image decoder 500 based on coding units, according to an exemplary embodiment. Referring to FIG. 5, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 performs operations based on a size of a transformation unit for each coding unit.

Figure 6:
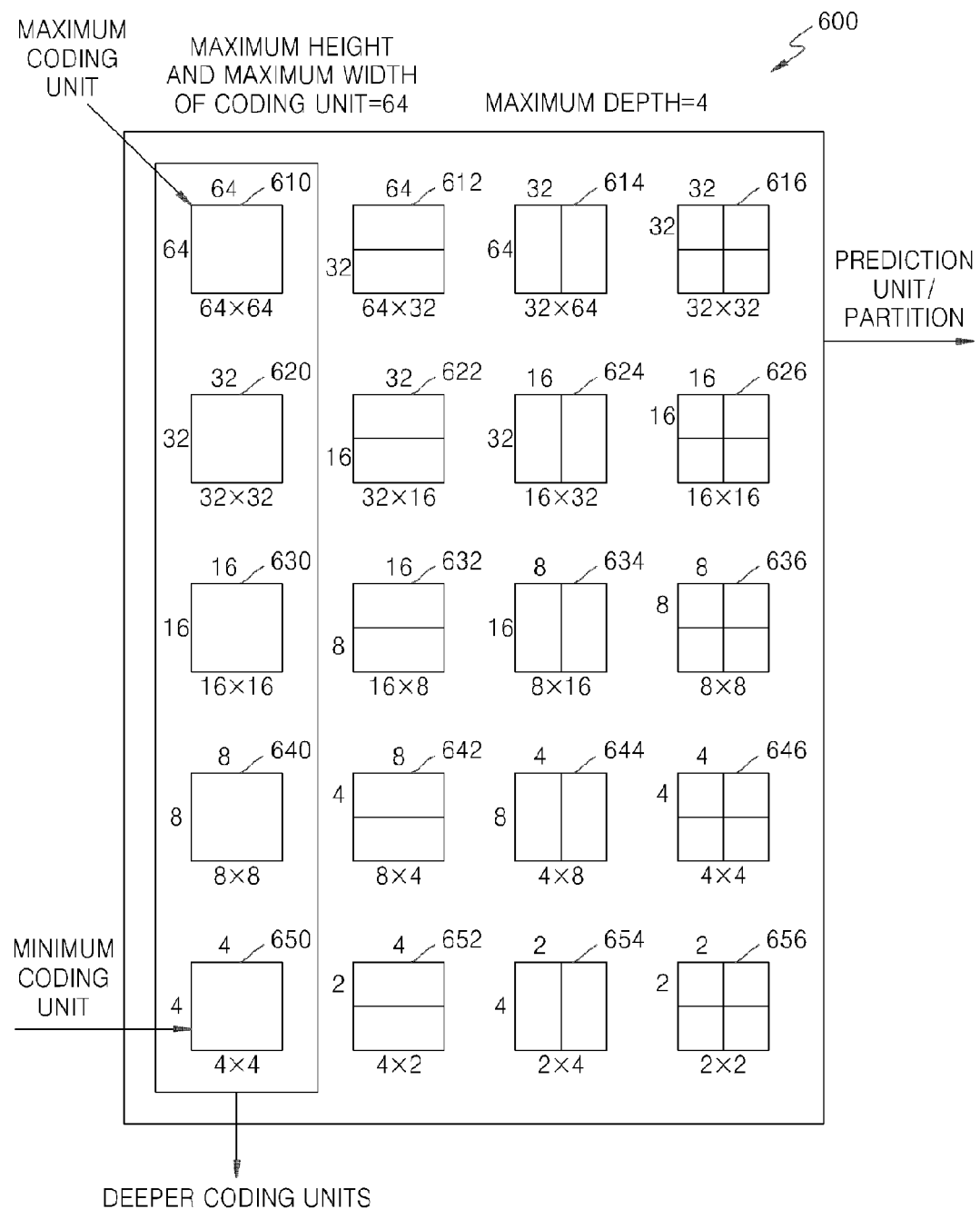
FIG. 6 is a diagram illustrating deeper coding units according to depths and prediction units according to an exemplary embodiment.

FIG. 6 is a diagram illustrating deeper coding units according to depths, and partitions, according to an exemplary embodiment. A video encoding apparatus 100 according to an exemplary embodiment and a video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to a predetermined maximum size of the coding unit.

Referring to FIG. 6, in a hierarchical structure 600 of coding units, according to an exemplary embodiment, the maximum height and the maximum width of the coding units are each 64, and the maximum depth is 4. Since a depth deepens (i.e., increases) along a vertical axis of the hierarchical structure 600, a height and a width of the deeper coding units are each split. Also, a prediction unit and partitions, which are bases for prediction encoding of each deeper coding unit, are shown along a horizontal axis of the hierarchical structure 600.

For example, a first coding unit 610 is a maximum coding unit in the hierarchical structure 600, wherein a depth thereof is 0 and a size, i.e., a height by width, thereof is 64×64. The depth deepens along the vertical axis such that the hierarchical structure 600 includes a second coding unit 620 having a size of 32×32 and a depth of 1, a third coding unit 630 having a size of 16×16 and a depth of 2, a fourth coding unit 640 having a size of 8×8 and a depth of 3, and a fifth coding unit 650 having a size of 4×4 and a depth of 4. The fifth coding unit 650 having the size of 4×4 and the depth of 4 is a minimum coding unit.

The prediction unit and the partitions of the coding units 610, 620, 630, 640, and 650 are arranged along the horizontal axis according to each depth. In other words, if the first coding unit 610 having the size of 64×64 and the depth of 0 is a prediction unit, the prediction unit may be split into partitions included in the first coding unit 610, i.e. a partition 610 having a size of 64×64, partitions 612 having a size of 64×32, partitions 614 having the size of 32×64, or partitions 616 having a size of 32×32.

Similarly, a prediction unit of the second coding unit 620 having the size of 32×32 and the depth of 1 may be split into partitions included in the second coding unit 620, i.e. a partition 620 having a size of 32×32, partitions 622 having a size of 32×16, partitions 624 having a size of 16×32, and partitions 626 having a size of 16×16.

Similarly, a prediction unit of the third coding unit 630 having the size of 16×16 and the depth of 2 may be split into partitions included in the third coding unit 630, i.e. a partition having a size of 16×16 included in the third coding unit 630, partitions 632 having a size of 16×8, partitions 634 having a size of 8×16, and partitions 636 having a size of 8×8.

Similarly, a prediction unit of the fourth coding unit 640 having the size of 8×8 and the depth of 3 may be split into partitions included in the fourth coding unit 640, i.e. a partition having a size of 8×8 included in the fourth coding unit 640, partitions 642 having a size of 8×4, partitions 644 having a size of 4×8, and partitions 646 having a size of 4×4.

The fifth coding unit 650 having the size of 4×4 and the depth of 4 is the minimum coding unit and a coding unit of the lowermost depth. A prediction unit of the fifth coding unit 650 is assigned to a partition having a size of 4×4.

In order to determine the at least one coded depth of the coding units of the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the first coding unit 610 may be selected as the coded depth and a partition type of the first coding unit 610.

FIG. 7 is a diagram for describing a relationship between a coding unit 710 and transformation units 720, according to an exemplary embodiment. The video encoding apparatus 100 according to an exemplary embodiment and a video decoding apparatus 200 according to an exemplary embodiment encodes and decodes, respectively, an image according to coding units having sizes smaller than or equal to a maximum coding unit for each maximum coding unit. Sizes of transformation units for transformation during encoding may be selected based on data units that are not larger than a corresponding coding unit.

Referring to FIG. 7, for example, in the video encoding apparatus 100, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding errors may be selected.

FIG. 8 is a diagram for describing encoding information of coding units corresponding to a coded depth, according to an exemplary embodiment. Referring to FIG. 8, the output unit 130 of a video encoding apparatus 100 according to an exemplary embodiment may encode and transmit first information 800 about a partition type, second information 810 about a prediction mode, and third information 820 about a size of a transformation unit for each coding unit corresponding to a coded depth, as information about an encoding mode.

The first information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the first information 800 about a partition type is set to indicate one of the partition 804 having a size of 2N×N, the partition 806 having a size of N×2N, and the partition 808 having a size of N×N The second information 810 indicates a prediction mode of each partition. For example, the second information 810 may indicate a mode of prediction encoding performed on a partition indicated by the first information 800, i.e., an intra mode 812, an inter mode 814, or a skip mode 816.

The third information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
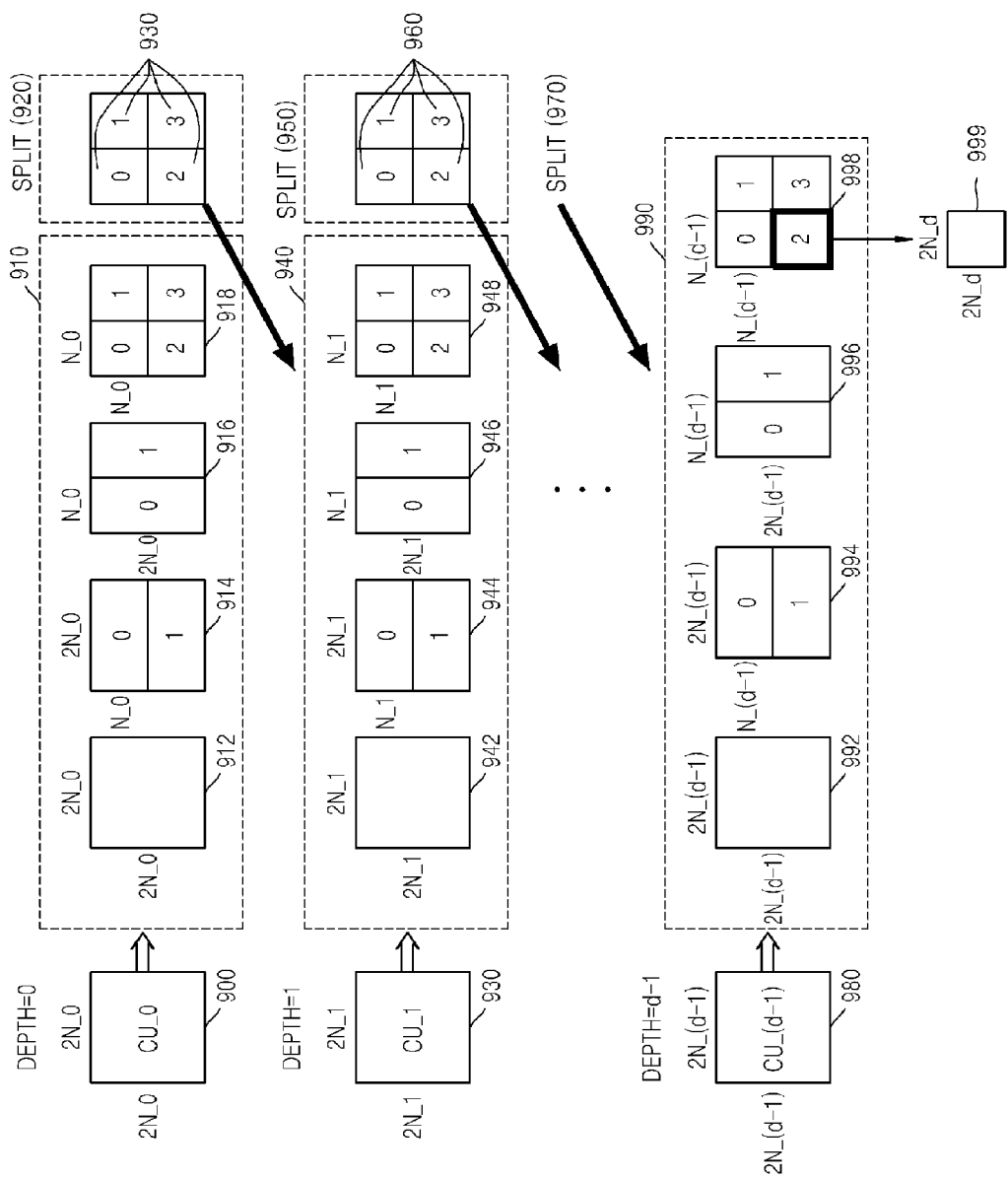
FIG. 9 is a diagram of deeper coding units according to depths, according to an exemplary embodiment.

An image data and encoding information extractor 220 of a video decoding apparatus 200 according to an exemplary embodiment may extract and use the information 800, 810, and 820 for decoding, according to each deeper coding unit FIG. 9 is a diagram of deeper coding units according to depths, according to an exemplary embodiment. Split information may be used to indicate a change of a depth. The spilt information indicates whether a coding unit of a current depth is split into coding units of a lower depth.

Referring to FIG. 9, a prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but it is understood that a partition type is not limited thereto in another exemplary embodiment. For example, according to another exemplary embodiment, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the minimum encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0× N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1× N_1.

If an encoding error is the smallest in the partition type 948, a depth is changed from 1 to 2 to split the partition type 948 in operation 950, and encoding is repeatedly performed on coding units 960, which have a depth of 2 and a size of N_2× N_2 to search for a minimum encoding error.

When a maximum depth is d, split operations according to each depth may be performed up to when a depth becomes d−1, and split information may be encoded up to when a depth is one of 0 to d−2. For example, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units of a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be considered a minimum unit for the current maximum coding unit. A minimum unit according to an exemplary embodiment may be a rectangular data unit obtained by splitting a minimum coding unit 980 by 4. By performing the encoding repeatedly, a video encoding apparatus 100 according to an exemplary embodiment may select a depth having the minimum encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding errors may be determined as a coded depth. At least one of the coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth are set to 1.

An image data and encoding information extractor 220 of a video decoding apparatus 200 according to an exemplary embodiment may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include at least one of split information about a coding unit, information about a partition type, information about a prediction mode, and information about a size of a transformation unit. Table 1 shows exemplary encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode |
| Intra | Symmetrical Partition Type | Asymmetrical Partition Type | Split Information 0 of Transformation Unit | Split Information 1 of Transformation Unit | Coding Units having Lower Depth of d + 1 |
| Inter | | | | | |
| Skip (Only 2N × 2N) | | | | | |
| | 2N × 2N | 2N × nU | 2N × 2N | N × N (Symmetrical Type) | |
| | 2N × N | 2N × nD | | | |
| | N × 2N | nL × 2N | | N/2 × N/2 (Asymmetrical Type) | |
| | N × N | nR × 2N | | | |

Figure 10:
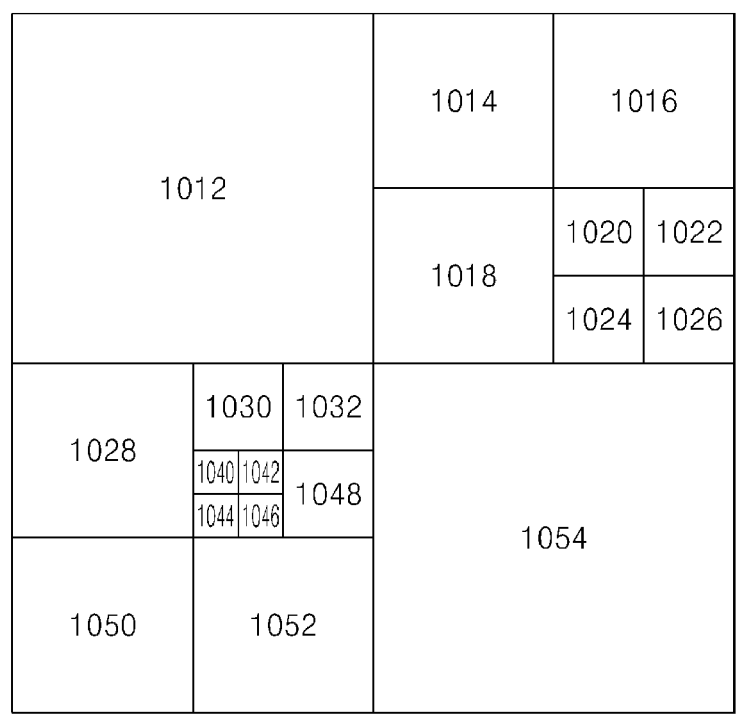
FIGS. 10 through 12 are diagrams for describing a relationship between coding units, prediction units, and transformation units, according to an exemplary embodiment.
Figure 11:
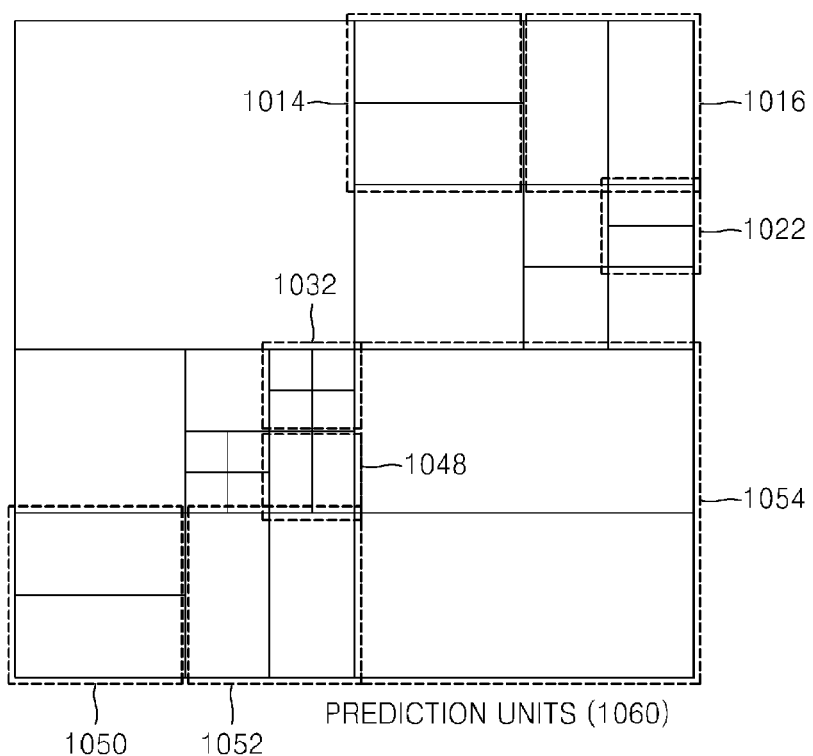
Figure 12:
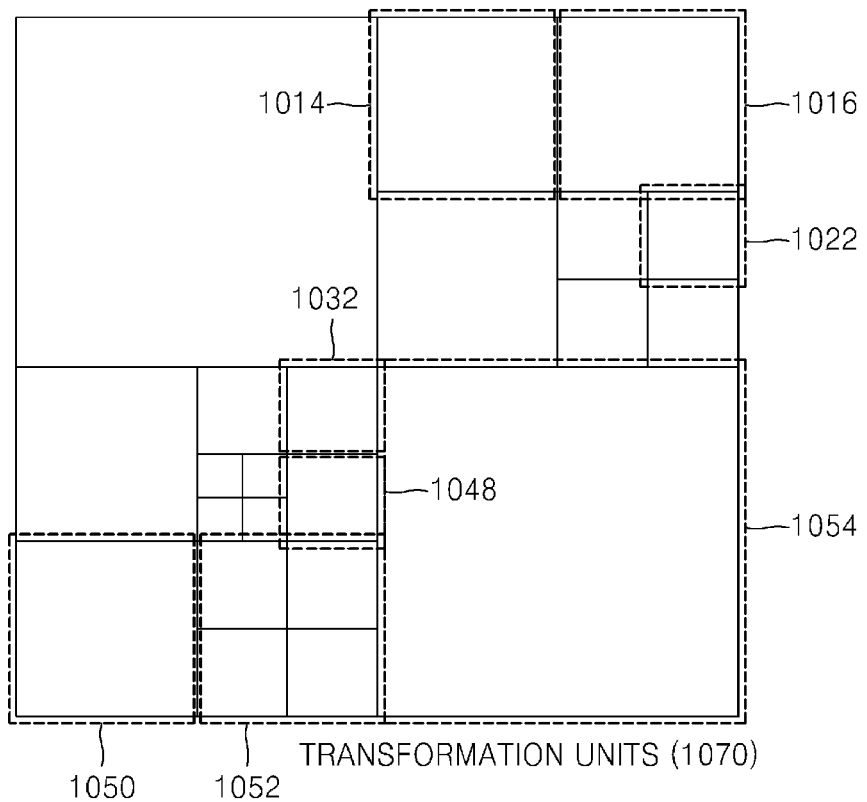

FIGS. 10 through 12 are diagrams for describing a relationship between coding units 1010, prediction units 1060, and transformation units 1070, according to an exemplary embodiment.

Referring to FIGS. 10 through 12, the coding units 1010 are coding units having a tree structure, corresponding to coded depths determined by a video encoding apparatus 100 according to an exemplary embodiment, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units of the coding units 1010. For example, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. For example, video encoding and decoding apparatuses 100 and 200 according to exemplary embodiments may perform An output unit 130 of the video encoding apparatus 100 may output the encoding information about the coding units having a tree structure, and an image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth in which a current coding unit is no longer split into a lower depth is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting at least one of a height and a width of a prediction unit, and asymmetrical partition types having sizes of 2N×nU, 2N×nD, nL×2N, and nR×2N, which are obtained by asymmetrically splitting at least one of the height and the width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. For example, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit including the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Therefore, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
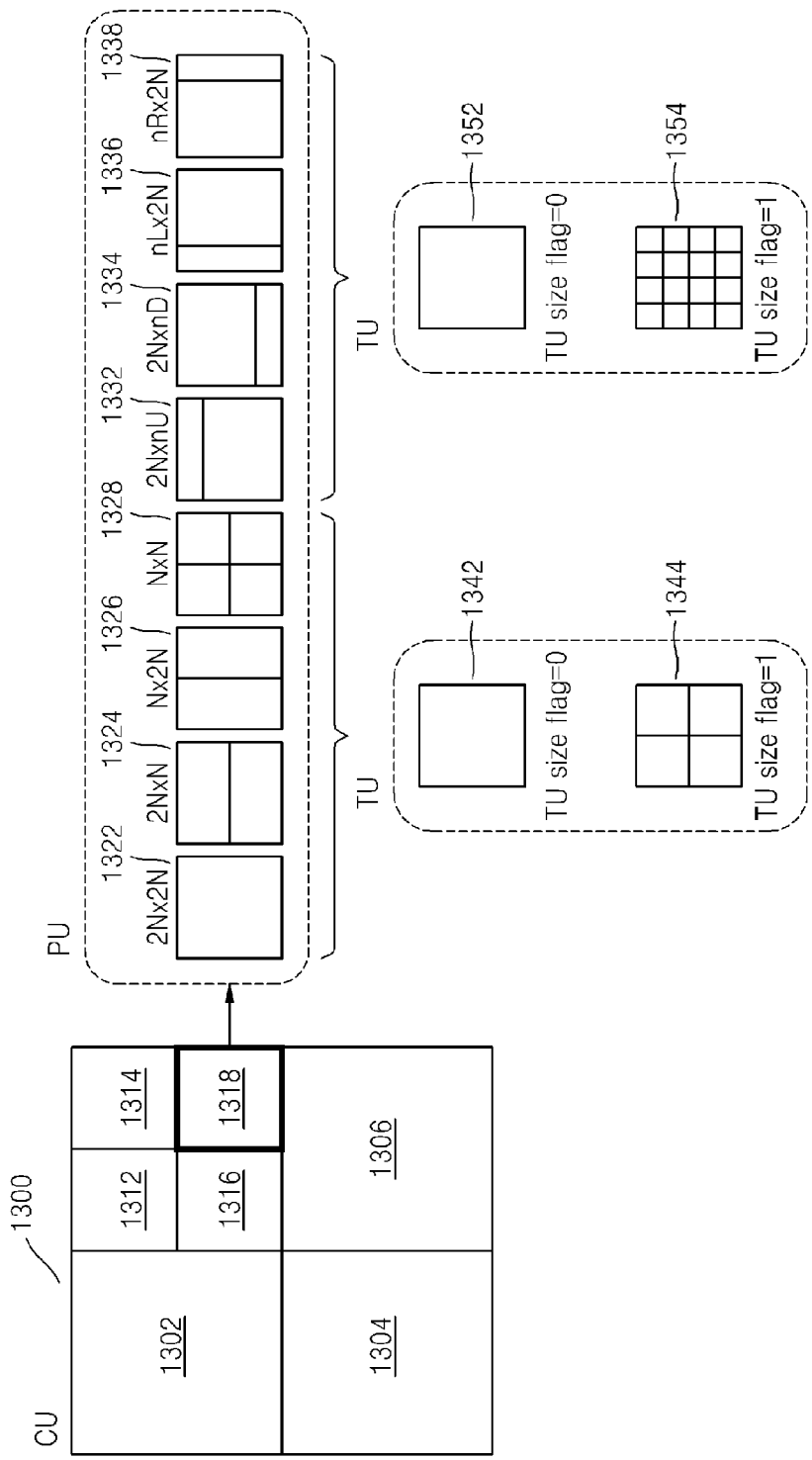
FIG. 13 is a diagram for describing a relationship between a coding unit, a prediction unit, and a transformation unit, according to encoding mode information according to an exemplary embodiment.

FIG. 13 is a diagram for describing a relationship between a coding unit, a prediction unit or a partition, and a transformation unit, according to encoding mode information of Table 1 according to an exemplary embodiment. Referring to FIG. 13, a maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, or a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, though it is understood that another exemplary embodiment is not limited to a 1-bit flag, and a transformation unit may be hierarchically split having a tree structure while the TU size flag increases from 0 in another exemplary embodiment.

In this case, the size of a transformation unit that has been actually used may be expressed by using a TU size flag of a transformation unit, according to an exemplary embodiment, together with a maximum size and minimum size of the transformation unit. According to an exemplary embodiment, a video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, a video decoding apparatus 200 may decode video by using the maximum transformation unit size information, the minimum transformation unit size information, and the maximum TU size flag.

For example, if the size of a current coding unit is 64×64 and a maximum transformation unit size is 32×32, the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, the TU size flag may be 0 or 1. Here, the TU size flag cannot be set to a value other than 0 or 1.

Thus, if it is defined that the maximum TU size flag is MaxTransformSizeIndex, a minimum transformation unit size is MinTransformSize, and a transformation unit size is RootTuSize when the TU size flag is 0, then a current minimum transformation unit size CurrMinTuSize that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1).$$

Compared to the current minimum transformation unit size CurrMinTuSize that can be determined in the current coding unit, a transformation unit size 'RootTuSize' when the TU size flag is 0 may denote a maximum transformation unit size that can be selected in the system. In Equation (1), RootTuSize/(2^MaxTransformSizeIndex) denotes a transformation unit size when the transformation unit size RootTuSize, when the TU size flag is 0, is split a number of times corresponding to the maximum TU size flag, and MinTransformSize denotes a minimum transformation size. Thus, a smaller value from among RootTuSize/(2^MaxTransformSizeIndex) and MinTransformSize may be the current minimum transformation unit size CurrMinTuSize that can be determined in the current coding unit.

According to an exemplary embodiment, the maximum transformation unit size RootTuSize may vary according to the type of a prediction mode. For example, if a current prediction mode is an inter mode, then RootTuSize may be determined by using Equation (2) below. In Equation (2), MaxTransformSize denotes a maximum transformation unit size, and PUSize denotes a current prediction unit size:

$$\text{RootTuSize} = \min(\text{MaxTransformSize}, \text{PUSize}) \quad (2).$$

That is, if the current prediction mode is the inter mode, the transformation unit size RootTuSize when the TU size flag is 0 may be a smaller value from among the maximum transformation unit size and the current prediction unit size.

If a prediction mode of a current partition unit is an intra mode, RootTuSize may be determined by using Equation (3) below. In Equation (3), PartitionSize denotes the size of the current partition unit:

$$RootTuSize=\min(MaxTransformSize, PartitionSize) \quad (3).$$

That is, if the current prediction mode is the intra mode, the transformation unit size RootTuSize when the TU size flag is 0 may be a smaller value from among the maximum transformation unit size and the size of the current partition unit.

However, the current maximum transformation unit size RootTuSize that varies according to the type of a prediction mode in a partition unit is just an example and it is understood that another exemplary embodiment is not limited thereto.

An index and a scanning order of a data unit based on coding units having a tree structure, a prediction unit, and a transformation unit, according to one or more exemplary embodiments will now be described in detail with reference to FIGS. 14 through 27.

A video encoding apparatus 100 according to an exemplary embodiment uses a raster scanning order as an order in which encoding is performed in units of maximum coding units included in a slice. Hierarchical coding units according to depths included in a maximum coding unit may be scanned in a zigzag manner among coding units corresponding to the same depth. Encoding of minimum units of each maximum coding unit may be performed in a raster scanning order.

The video encoding apparatus 100 may refer to information about a neighborhood of a current data unit (hereinafter, referred to as neighborhood information of a current data unit) in order to encode image data corresponding to the current data unit. For example, when a current maximum coding unit, a current coding unit corresponding to a coded depth, or a current prediction unit are prediction-encoded, information about a maximum coding unit or current coding units according to depths adjacent to the current maximum coding unit, the current coding unit corresponding to coded depth or the current prediction unit, and the like may be referred to.

In detail, the neighborhood information may include information about at least one of a maximum coding unit on a left side of the current maximum coding unit, a maximum coding unit on an upper side thereof, a maximum coding unit on a right upper side thereof, a maximum coding unit on a left upper side thereof, etc. The neighborhood information may include information about coding units located on at least one of the left side, the upper side, the right upper side, and the left upper side of the current maximum coding unit. The neighborhood information may also include information about prediction units located on the left side, the upper side, the right upper side, the left upper side of the current maximum coding unit, etc. The neighborhood information may also include information about partitions located on at least one of the left side, the upper side, the right upper side, the left upper side of the current maximum coding unit, etc.

The neighborhood information may also include information about minimum units located on at least one of the left side, the upper side, the right upper side, the left upper side of the current prediction unit, etc.

Furthermore part of a data unit, as opposed to an entirety of data unit may be referred to, as the neighborhood information. For example, the neighborhood information may include a right boundary of a maximum coding unit located on a left lower side of the current prediction unit.

Since a data unit located on the left lower side of a current data unit is scanned later than the current data unit according to a raster scanning order of an exemplary embodiment, the data unit located on the left lower side of the current data unit may not be referred to when encoding a current macroblock, in a macroblock encoding method complying with a raster scanning order. However, in the present exemplary embodiment, even when maximum coding units only comply with a raster scanning order, since minimum units and data units in the maximum coding units can be scanned in a zigzag manner, the minimum units and the data units may serve as the neighborhood information.

A coding unit determiner 120 of the video encoding apparatus 100 may check a location and usability of a predetermined coding unit. The checked coding unit may a coding unit having a tree structure, that is, a coding unit corresponding to a coded depth. The coding unit determiner 120 may check the location and usability of a data unit adjacent to a current data unit. The data unit adjacent to the current data unit may include at least one of data units located on the left side, the upper side, the right upper side, and the left upper side of the current data unit. The adjacent data unit to be checked may include at least one of a maximum coding unit, a coding unit, a prediction unit, a partition, a transformation unit, and a minimum unit.

An image data decoder 230 of a video decoding apparatus 200 according to an exemplary embodiment considers a raster scanning order for maximum coding units and a zigzag scanning order for coding units according to depths, in order to decode image data corresponding to each maximum coding unit encoded based on information about an coded depth and an encoding mode for each maximum coding unit to restore a current picture. Hereinafter, a coding unit that is scanned in consideration of a raster scanning order for maximum coding units and a zigzag scanning order for coding units according to depths is a coding unit corresponding to a coded depth from among coding units having a tree structure.

Neighborhood information may be referred to in order to decode a current data unit. For example, inter prediction on a current partition may be performed by referring to a motion vector of a partition adjacent to the current partition. Moreover, inter prediction on a current partition may be performed by referring to a pixel value of a data unit adjacent to a pixel value of the current partition.

The image data decoder 230 may check the location, usability, and the like of the adjacent data unit which can be referred to in order to decode the current data unit. Accordingly, the image data decoder 230 may refer to neighborhood information by checking the usability of the neighborhood information, in consideration of a raster scanning order for maximum coding units and partitions and a zigzag scanning order or a raster scanning order for minimum units.

The image data decoder 230 may check the locations of data units based on a scanning order. For example, the location of each maximum coding unit may be searched for, based on addresses of maximum coding units according to a raster scanning order.

Based on indices of minimum units according to a zigzag scanning order, the locations of the minimum units in a maximum coding unit may be searched for. Alternatively, based on the indices of minimum units according to a raster scanning order, the locations of the minimum units in a maximum coding unit may be searched for. The indices of the minimum units according to a zigzag scanning order and the indices of the minimum units according to a raster scanning order may be mutually transformed to each other. For convenience of explanation, an index based on a scanning order is hereinafter referred to as a scan index.

Respective scan indices of a coding unit, a prediction unit, and a transformation unit may be expressed based on a scan index of a minimum unit in a corresponding maximum coding unit. A scan index of a partition of the prediction unit may also be expressed based on the scan index of the minimum unit in the corresponding maximum coding unit.

Locations or coordinates of samples of the coding unit and the prediction unit may be expressed as coordinates in the corresponding maximum coding unit. Locations or coordinates of samples of the partition of the prediction unit and the transformation unit may also be expressed as coordinates in the corresponding prediction unit.

A location of a current maximum coding unit may be expressed as a location of a pixel located on the left upper side of the current maximum coding unit, which is relative to a location of a sample located on the left upper side of a current slice. A location of a current minimum unit may be expressed as a location of a pixel located on the left upper side of the current minimum unit, which is relative to a location of a sample located on the left upper side of a corresponding maximum coding unit.

The image data decoder 230 may check a location and usability of a predetermined coding unit. The coding unit to be checked may a coding unit having a tree structure, that is, a coding unit corresponding to a coded depth. The image data decoder 230 may check the location and usability of a maximum coding unit adjacent to a current maximum coding unit. The maximum coding unit adjacent to the current maximum coding unit may include at least one of maximum coding units located on the left side, the upper side, the right upper side, and the left upper side of the current maximum coding unit.

The image data decoder 230 may check a location, an index, and usability of a coding unit adjacent to a current coding unit. The coding unit adjacent to the current coding unit may include at least one of coding units located on the left side and the upper side of the current coding unit. The checked coding unit may be one of the coding units having a tree structure, that is, a coding unit corresponding to a coded depth.

The image data decoder 230 may check a location, an index, and usability of a prediction unit adjacent to a current prediction unit. The prediction unit adjacent to the current prediction unit may include at least one of prediction units located on the left side, the upper side, the right upper side, and the left upper side of the current prediction unit.

The image data decoder 230 may check a location, an index, and usability of a partition adjacent to a current prediction unit. The partition adjacent to the current prediction unit may include at least one of partitions located on the left side, the upper side, the right upper side, and the left upper side of the current prediction unit.

The image data decoder 230 may check a location, an index, and usability of a minimum unit adjacent to a current prediction unit included in a current maximum coding unit. The minimum unit adjacent to the current prediction unit may include at least one of minimum units located on the left side, the upper side, the right upper side, and the left upper side of the current prediction unit.

The image data decoder 230 may check a location and usability of a boundary adjacent to a current prediction unit. The boundary adjacent to the current prediction unit may include a boundary of at least one of data units located on the left side, the upper side, the right upper side, the left upper side, and the left lower side of the current prediction unit. Locations of pixels on the boundary may be expressed as a coordinate relative to a location of a pixel on the left upper side of a current coding unit or may be expressed as a coordinate relative to a location of a sample on the left upper side of a current maximum coding unit. If a pixel adjacent to the current coding unit deviates from the current maximum coding unit, the pixel may be determined to be not useable.

The image data decoder 230 may check usability of coding units according to depths or a prediction unit that include a minimum unit, based on encoding information of the minimum unit. Accordingly, the image data decoder 230 may check locations or usabilities of a prediction unit, coding units according to depths, a maximum coding unit, and the like adjacent to a current data unit, by using encoding information of a minimum unit adjacent to the current data unit.

According to a raster scanning order, at a point in time when a current maximum coding unit is scanned, a maximum coding unit located on the left side or the upper side of the current maximum coding unit has already been decoded, but a maximum coding unit located on the right side or the lower side of the current maximum coding unit has not yet been decoded.

A case where a maximum coding unit includes at least one macroblock is assumed to compare existing macroblocks with hierarchical data units according to an exemplary embodiment. A case where a first macroblock and a second macroblock are included in the same maximum coding unit and the first macroblock is on the left lower side of the second macroblock will now be illustrated.

According to a raster scanning order, the first macroblock is scanned later than the second macroblock. According to a zigzag scanning order, the first macroblock is scanned earlier than the second macroblock. In an encoding method, since the first macroblock is scanned later than the second macroblock according to a raster scanning order is encoded and decoded later than the second macroblock, the second macroblock may not refer to information about the first macroblock. However, the video encoding apparatus 100 according to an embodiment of the present invention may refer to the first macroblock as neighborhood information of the second macroblock when encoding the second macroblock.

Since the video encoding apparatus 100 and the video decoding apparatus 200 according to exemplary embodiments use not only a raster scanning method, but also a zigzag scanning method for each of hierarchical coding units having a tree structure, the apparatuses 100 and 200 may use a wide range of neighborhood information compared with the related art.

Figure 14:
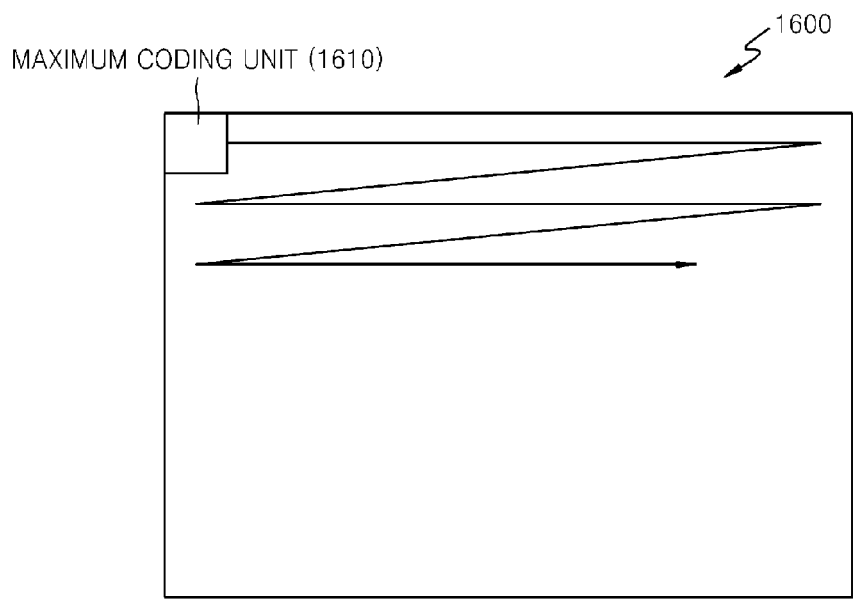
FIG. 14 illustrates a raster scanning order of a maximum coding unit, according to an exemplary embodiment.

FIG. 14 illustrates a raster scanning order of a maximum coding unit 1610, according to an exemplary embodiment. Referring to FIG. 14, the maximum coding unit 1610 is scanned from a left end of a picture 1600 to a right end of the picture 1600, and from an upper end of the picture 1600 to a lower end of the picture, according to the raster scanning order. Accordingly, according to the raster scanning order, at a point in time when a current maximum coding unit is scanned, a maximum coding unit located on the left side or upper side of the current maximum coding unit has already been scanned, but a maximum coding unit located on the right side or lower side of the current maximum coding unit has not yet been scanned.

A video decoding apparatus 200 according to an exemplary embodiment may be aware of the location of a current maximum coding unit complying with a raster scanning order, by ascertaining an address of the current maximum coding unit, a size of a maximum coding unit, and a size of a picture. Here, a location of the current maximum coding unit corresponds to a distance from a left upper end of the picture to a left upper end of the current maximum coding unit, and may be expressed as a location of a pixel on the left upper side of the current maximum coding unit, which is relative to a location of a sample on the left upper side of the picture.

A scanning order of partitions of coding units according to depths will now be described with reference to FIG. 9. According to the depths 0 through d−1, the partitions of coding units according to depths comply with a raster scanning order. For example, if the depth is 0, a partition type 914 having a size of 2N_0×N_0 and a partition type 916 having a size of N_0×2N_0 are each scanned in such as way that partitions having indices of 0 and 1 are scanned in an index order. A partition type 918 having a size of N_0×N_0 is scanned in such as way that partitions having indices of 0, 1, 2, and 3 are scanned in an index order.

An image data decoder 230 of the video decoding apparatus 200 may search for a location of a partition in each of coding units according to depths. In a current coding unit, when the index of a current partition, the size of each partition, and the size of the current coding unit are known, the location of the current partition complying with a raster scanning order may be ascertained.

Here, the location of the current partition corresponds to a distance from a left upper end of a current data unit to a left upper end of the current partition, and may be expressed as a location of a pixel on the left upper end of the current partition, which is relative to a location of a sample on the left upper end of the current data unit.

Figure 15:
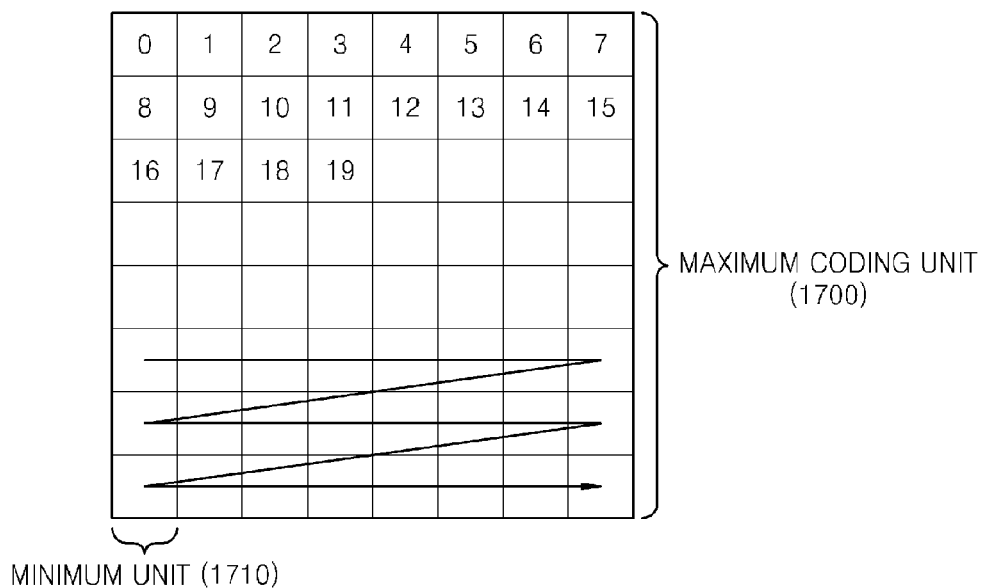
FIG. 15 illustrates a raster scanning order of minimum units, according to an exemplary embodiment.
Figure 16:
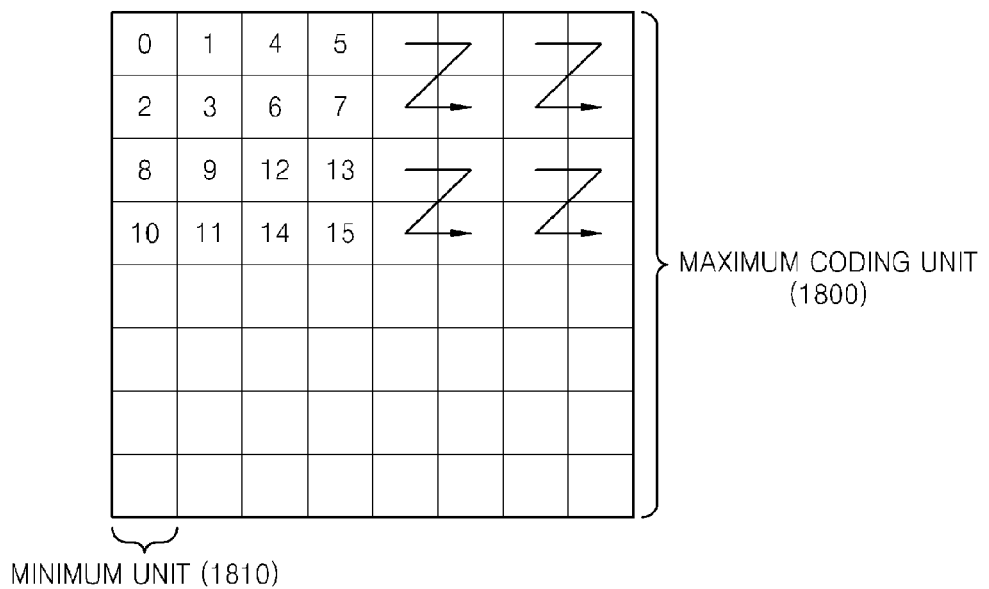
FIG. 16 illustrates a zigzag scanning order of minimum units, according to an exemplary embodiment.

According to one or more exemplary embodiments, minimum units in a maximum coding unit may be scanned in a zigzag scanning order or a raster scanning order. Accordingly, an index based on a zigzag scanning order and an index based on a raster scanning order may be defined for each minimum unit. FIG. 15 illustrates minimum units 1710 complying with a raster scanning order according to an exemplary embodiment, and FIG. 16 illustrates minimum units 1810 complying with a zigzag scanning order according to an exemplary embodiment.

Referring to FIG. 15, the minimum units 1710 are scanned in a raster scanning order, namely, from a left end of a maximum coding unit 1700 to a right end thereof and from an upper end thereof to a lower end thereof. Thus, scanning is performed starting from the minimum unit 1710 on the upper end and in an order of minimum units having indices of 0, 1, 2, 3, 4, 5, 6, and 7 from the left end to the right end. Then, the scanning moves down and is performed in an order of minimum units having indices of 8, 9, 10, 11, 12, 13, 14, and 15. The scanning moves down again and is performed in an order of minimum units having indices of 16, 17, 18, and 19.

An image data decoder 230 of a video decoding apparatus 200 according to an exemplary embodiment may search for locations of the minimum units in each maximum coding unit. When the index of a current minimum unit, the size of each minimum unit, and the size of the current maximum coding unit complying with a raster scanning order are known, the location of the current minimum unit complying with a raster scanning order may be ascertained.

Here, the location of the current minimum unit corresponds to a distance from a left upper end of a current maximum coding unit to a left upper end of the current minimum unit, and may be expressed as a location of a pixel on the left upper end of the current minimum unit, which is relative to a location of a sample on the left upper end of the current maximum coding unit.

Referring to FIG. 16, scanning in a zigzag scanning order is performed among coding units corresponding to the same depth. For example, a maximum coding unit 1800 has a depth of 0, and the minimum units 1810 have a depth of 3. Four minimum units are grouped, and zigzag scanning may be performed in units of the group. In other words, minimum units 1810 having indices of 0, 1, 2, and 3 are scanned in a zigzag scanning order, and minimum units 1810 having indices of 4, 5, 6, and 7 are scanned in a zigzag scanning order.

A group of the minimum units 1810 having indices of 0, 1, 2, and 3 is a coding unit having a depth of 2. Accordingly, a first group including the minimum units 1810 having indices of 0, 1, 2, and 3, a second group including the minimum units 1810 having indices of 4, 5, 6, and 7, a third group including the minimum units 1810 having indices of 8, 9, 10, and 11, and a fourth group including the minimum units 1810 having indices of 12, 13, 14, and 15 are respectively coding units having depths of 2, and may be each scanned in a zigzag scanning order.

Similarly, scanning may be performed in a zigzag scanning order among 4 coding units corresponding to the depth of 1, wherein each of the coding units corresponding to the depth of 1 includes four coding units corresponding to the depth of 2.

An image data decoder 230 of a video decoding apparatus 200 according to an exemplary embodiment may search for locations of the minimum units in a maximum coding unit. When the index of a current minimum unit, the size of each minimum unit, and the size of the current maximum coding unit complying with a zigzag scanning order are known, the location of the current minimum unit complying with a zigzag scanning order may be ascertained.

Here, the location of the current minimum unit corresponds to a distance from a left upper end of a current maximum coding unit to a left upper end of the current minimum unit, and may be expressed as a location of a pixel on the left upper end of the current minimum unit, which is relative to a location of a sample on the left upper end of the current maximum coding unit.

The image data decoder 230 of the video decoding apparatus 200 may mutually transform indices of minimum units according to a zigzag scanning order and indices of minimum units according to a raster scanning order to each other, within a maximum coding unit. The mutual transformation may be performed in consideration of a size of a maximum coding unit, a current depth, and a maximum depth.

Figure 17:
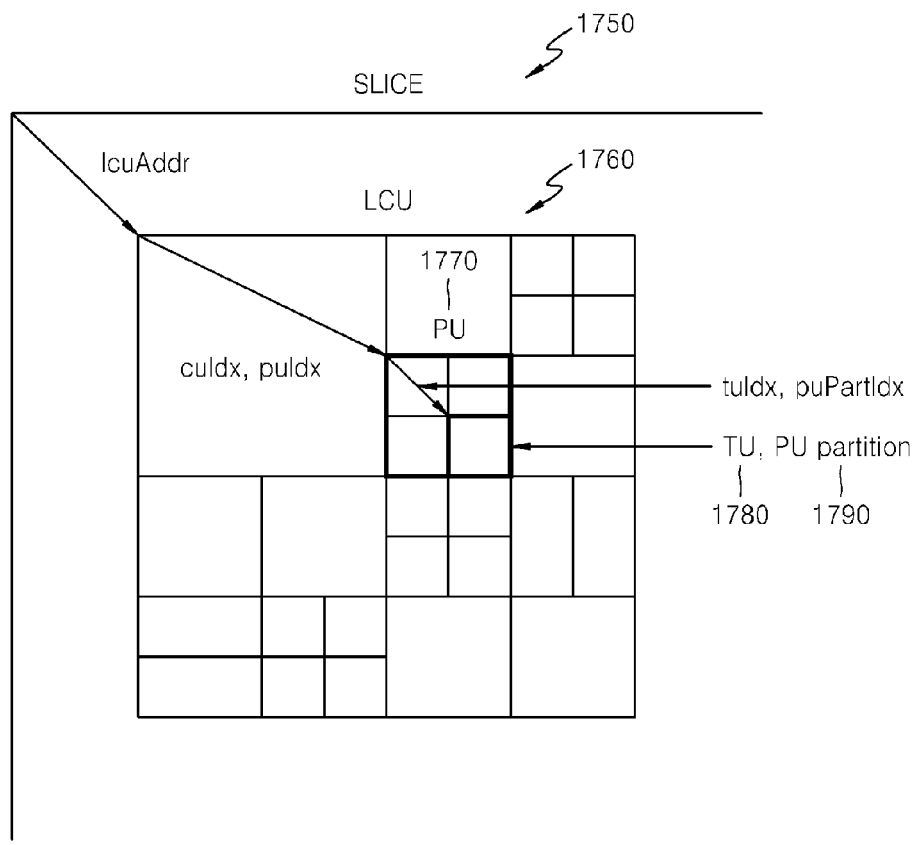
FIG. 17 illustrates a relationship between locations and scan indices of a coding unit, a prediction unit, a partition, and a transformation unit, according to an exemplary embodiment.

FIG. 17 illustrates a relationship between locations and scan indices of a coding unit, a prediction unit, a partition, and a transformation unit, according to an embodiment of the present invention. Referring to FIG. 17, a picture is split into slices, and a slice 1750 includes a plurality of maximum coding units LCUs. A location lcuAddr of a maximum coding unit 1760 from among the maximum coding units LCUs included in the slice 1750 may be expressed as a relative location of a sample on the left upper end of the maximum coding unit 1760 compared to a sample on the left upper end of the slice 1750.

A location of a coding unit 1770 from among coding units having a tree structure in the maximum coding unit 1760 may be expressed as a scan index cuIdx of the coding unit 1770 compared to the sample on the left upper end of the maximum coding unit 1760. If the coding unit 1770 is a coding unit corresponding to a coded depth, that is, a coding unit that is no longer split to a lower depth, the coding unit 1770 becomes a prediction unit 1770, and the location of the prediction unit 1770 may be expressed as a scan index puIdx of the prediction unit 1770 compared to the sample on the left upper end of the maximum coding unit 1760.

The prediction unit 1770 may be split into at least one PU partition. A PU partition 1790 from among the PU partitions of the prediction unit 1770 may be expressed as a scan index puPartIdx of the PU partition 1790 compared to the sample on the left upper end of the prediction unit 1770. The prediction unit 1770 may include at least transformation units TUs. A transformation unit 1780 from among the transformation units of the prediction unit 1770 may be expressed as a scan index tuIdx of the transformation unit 1780 compared to the sample on the left upper end of the prediction unit 1770.

A video encoding apparatus 100 according to an exemplary embodiment may use the locations and scan indices of a coding unit, a prediction unit, a partition, and a transformation unit described above with reference to FIG. 17, in order to perform video encoding. A video decoding apparatus 200 according to an exemplary embodiment may decode encoded data of an image based on coding units having a tree structure, by using the locations and scan indices of a coding unit, a prediction unit, a partition, and a transformation unit.

Figure 18:
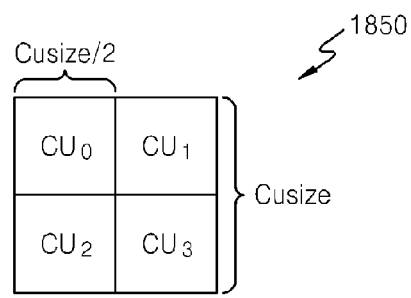
FIG. 18 illustrates a scan index of a coding unit, according to an exemplary embodiment.

FIG. 18 illustrates a scan index of a coding unit 1850, according to an exemplary embodiment. Referring to FIG. 18, the coding unit 1850 has a height of CUSize and a width of CUSize, and as the depth of the coding unit 1850 increases one level, the coding unit 1850 may be split into four coding units $CU_0$, $CU_1$, $CU_2$, and $CU_3$ corresponding to a lower depth. The coding units $CU_0$, $CU_1$, $CU_2$, $CU_3$ each have a height of CUSize/2 and a width of CUSize/2.

The scan index of the coding unit 1850 and the scan indices of the coding units $CU_0$, $CU_1$, $CU_2$, and $CU_3$ are expressed as scan indices of minimum units located on left upper ends of the coding unit 1850 and the coding units $CU_0$, $CU_1$, $CU_2$, and $CU_3$, and a scan index of a minimum unit represents an order that the minimum unit is scanned in a maximum coding unit. For example, the index cuIdx of the coding unit 1850 represents an index of a minimum unit on the left upper end of the coding unit 1850.

The size of a data unit such as a maximum coding unit, a coding unit, a prediction unit, a partition, or a transformation unit may be expressed as a number of minimum units thereof. For example, the number of minimum units arranged on a height (width) of a data unit may indicate the height (width) of the data unit.

Accordingly, since the scan indices of the coding units $CU_0$, $CU_1$, $CU_2$, and $CU_3$ correspond to locations apart from the left upper end of the coding unit 1850 by the coding units $CU_0$, $CU_1$, $CU_2$, and $CU_3$, the scan indices of the coding units $CU_0$, $CU_1$, $CU_2$, and $CU_3$ may be expressed using the sizes of the coding units $CU_0$, $CU_1$, $CU_2$, and $CU_3$ that increase from the scan index cuIdx of the coding unit 1850 in terms of the number of minimum units. In detail, the scan indices of the coding units $CU_0$, $CU_1$, $CU_2$, and $CU_3$ may be defined as follows:

(1) the scan index of the coding unit $CU_0$ is cuIdx. Thus, the scan index of the coding unit $CU_0$ is the same as that of the coding unit 1850, which is higher than the coding unit $CU_0$ in terms of depths.

(2) the scan index of the coding unit $CU_1$ increases from the scan index of the upper coding unit 1850 by the number of minimum units, CuSizeInSu/2, arranged on a width of the coding unit $CU_0$. Thus, the scan index of the coding unit $CU_1$ is cuIdx+CuSizeInSu/2.

(3) the scan index of the coding unit $CU_2$ increases from the scan index of the upper coding unit 1850 by a product of the number of minimum units, CuSizeInSu/2, arranged on a height of the coding unit $CU_0$ and the number of minimum units, LcuSizeInSu, arranged on a width of a maximum coding unit. Thus, the scan index of the coding unit $CU_2$ is cuIdx+CuSizeInSu/2* LcuSizeInSu.

(4) the scan index of the coding unit $CU_3$ increases from the scan index of the coding unit $CU_2$ by a horizontal size CuSizeInSu/2 of the coding unit $CU_2$. Thus, the scan index of the coding unit $CU_3$ is cuIdx+CuSizeInSu/2+CuSizeInSu/2*LcuSizeInSu.

Figure 19:
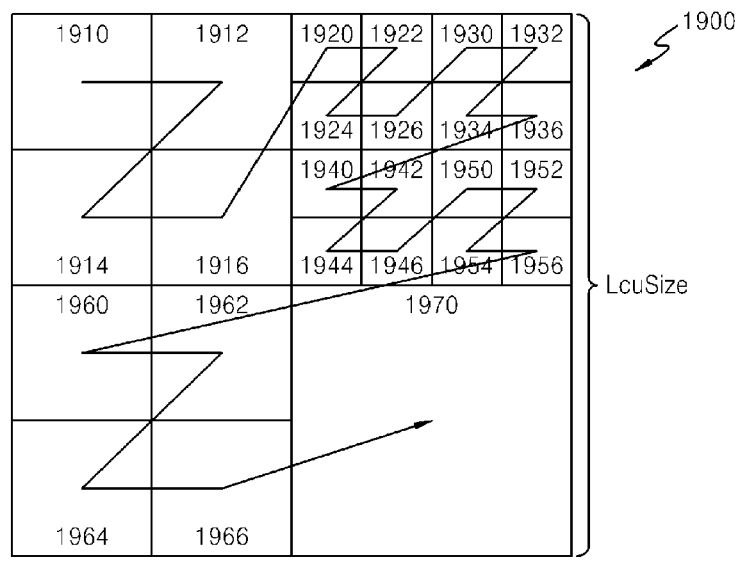
FIG. 19 illustrates a scanning order of coding units according to scan indices of the coding units, according to an exemplary embodiment.

FIG. 19 illustrates a scanning order of coding units according to scan indices of coding units, according to an exemplary embodiment. Referring to FIG. 19, coding units having a tree structure within a maximum coding unit 1900 may each have the same size as that of a minimum unit or may be repeatedly split until, for example, further splitting is not allowed or possible. The coding units having a tree structure within the maximum coding unit 1900 may include a coding unit 1970 having a depth of 1, coding units 1910, 1912, 1914, and 1916 having a depth of 2, coding units 1960, 1962, 1964, and 1966 having a depth of 2, and coding units 1920, 1922, 1924, 1926, 1930, 1932, 1934, 1936, 1940, 1942, 1944, 1946, 1950, 1953, 1954, and 1956 having a depth of 3.

According to the present exemplary embodiment, zigzag scanning is performed among all of the coding units having a tree structure, and is also performed among coding units having the same depth.

Accordingly, a scanning order and scan indices of the coding units having a tree structure within the maximum coding unit 1900 may be defined as the order of from the coding units having a depth of 2 (1910→1912→1914→1916), to the coding units having a depth of 3 (1920→1922→1924→1926), to the coding units having a depth of 3 (1930→1932→1934→1936), to the coding units having a depth of 3 (1940→1942→1944→1946), to the coding units having a depth of 3 (1950→1953→1954→1956), to the coding units having a depth of 2 (1960→1962→1964→1966), and to the coding unit 1970 having a depth of 1.

Figure 20:
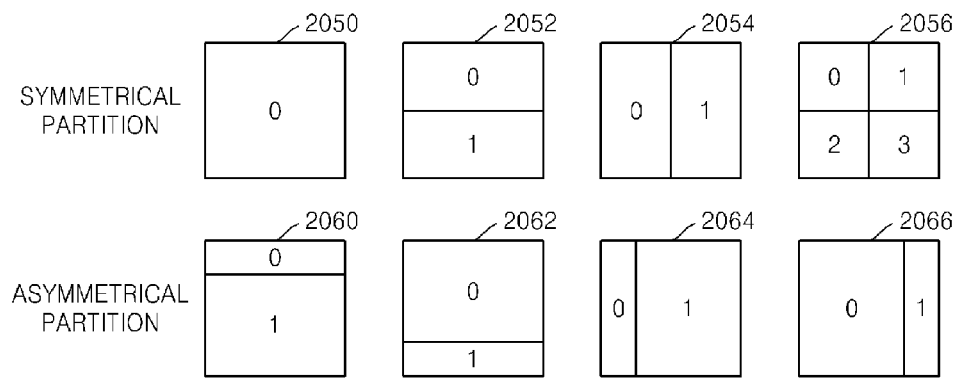
FIG. 20 illustrates scan indices of partitions according to partition types, according to an exemplary embodiment.

FIG. 20 illustrates scan indices of partitions of a prediction unit according to partition types, according to an exemplary embodiment. Referring to FIG. 20, the partitions of the prediction unit may be defined as symmetrical partition types 2050, 2052, 2054, and 2056 and asymmetrical partition types 2060, 2062, 2064, and 2066 according to ratios at which at least one of a height and a width of the prediction unit is split.

A location of the prediction unit may be expressed as an index of a prediction unit which is defined according to a size of a minimum unit. Numerals 0, 1, 2, and 3 marked within the symmetrical partition types 2050, 2052, 2054, and 2056 and the asymmetrical partition types 2060, 2062, 2064, and 2066 are scan indices of partitions of the prediction unit.

An image data decoder 230 according to an exemplary embodiment may search for a location of a prediction unit based on a scan index of the prediction unit. In detail, the image data decoder 230 may search for a relative location of a pixel on the left upper end of the prediction unit compared to a sample on the left upper end of a maximum coding unit, by using the scan index of the prediction unit, the height and width of a minimum unit, and the size of the maximum coding unit.

The image data decoder 230 may search for a location of a PU partition based on a scan index of the PU partition. In detail, the image data decoder 230 may search for a relative location of a pixel on the left upper end of the PU partition compared to the sample on the left upper end of the prediction unit, by using the scan index of the PU partition, the height and width of a minimum unit, and the size of the prediction unit.

Similarly, the image data decoder 230 may search for a location of a transformation unit based on a scan index of the transformation unit. In detail, the image data decoder 230 may search for a relative location of a pixel on the left upper end of the transformation unit compared to the sample on the left upper end of the prediction unit, by using the scan index of the transformation unit, the height and width of a minimum unit, and the size of the prediction unit.

Figure 21:
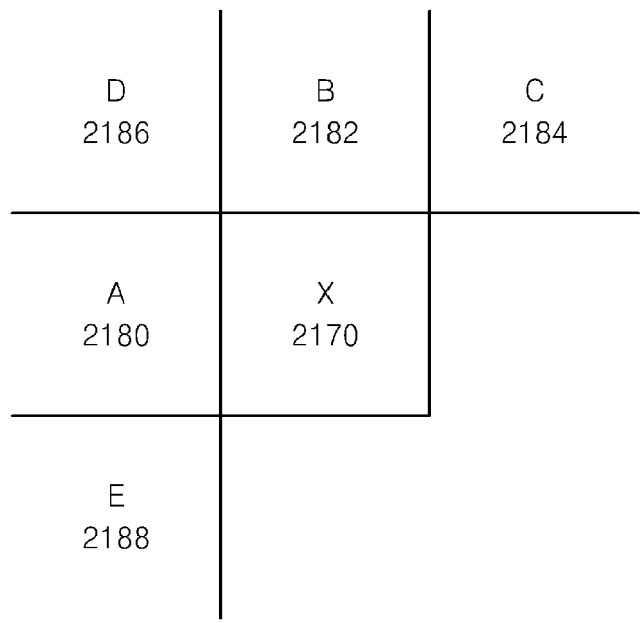
FIG. 21 illustrates data units that can be used as neighborhood information of a current data unit, according to an exemplary embodiment.

FIG. 21 illustrates data units that may be used as neighborhood information of a current data unit 2170 according to an exemplary embodiment. Referring to FIG. 21, a video encoding apparatus 100 and a video decoding apparatus 200 according to exemplary embodiments may refer to data units adjacent to the current data unit 2170 when encoding and decoding the current data unit 2170. A data unit is a maximum coding unit, a coding unit, a prediction unit, or a partition.

The data units adjacent to the current data unit X(2170) may be a left data unit A(2180), an upper data unit B(2182), a right upper data unit C(2184), a left upper data unit D(2186), and a left lower data unit E(2188).

Figure 22:
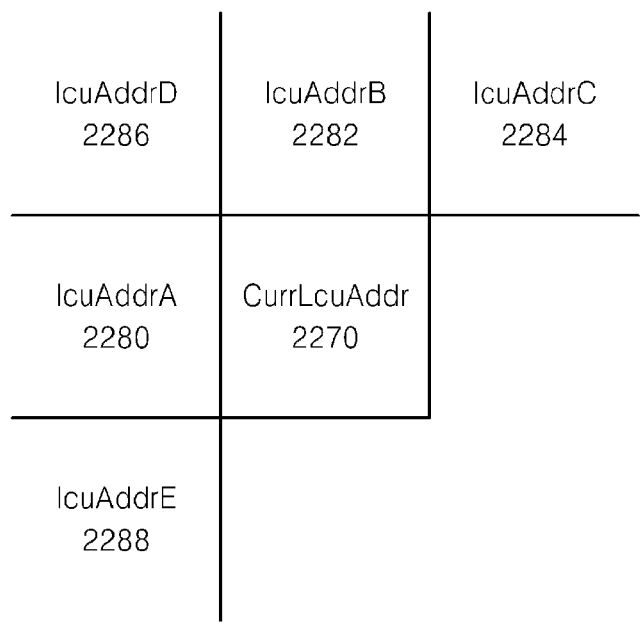
FIG. 22 illustrates maximum coding units adjacent to a current maximum coding unit, according to an exemplary embodiment.

FIG. 22 illustrates maximum coding units adjacent to a current maximum coding unit 2270 according to an exemplary embodiment. Referring to FIG. 22, a video encoding apparatus 100 according to an exemplary embodiment may refer to maximum coding units adjacent to the current maximum coding unit 2270 when encoding the current maximum coding unit 2270. A video decoding apparatus 200 according to an exemplary embodiment may refer to the maximum coding units adjacent to the current maximum coding unit 2270 when decoding the current maximum coding unit 2270.

The maximum coding units adjacent to the current maximum coding unit 2270 may be a left maximum coding unit 2280, an upper maximum coding unit 2282, a right upper maximum coding unit 2284, a left upper maximum coding unit 2286, and a left lower maximum coding unit 2288. The image data decoder 230 of the video decoding apparatus 200 may search for addresses and usabilities lcuAddrA, lcuAddrB, lcuAddrC, lcuAddrD, lcuAddrE of the adjacent maximum coding units 2280, 2282, 2284, 2286, and 2288. The adjacent maximum coding units 2280, 2282, 2284, 2286, and 2288 may be expressed as locations relative to an address CurrLcuAddr of the current maximum coding unit 2270.

An image data decoder 230 of the video decoding apparatus may check usability of each maximum coding unit. In a case other than case (i) where a maximum coding unit is not included in a current picture, case (ii) where a maximum coding unit is not included in a current slice, and case (iii) where an address of a maximum coding unit is later than that of a current maximum coding unit in terms of a scanning order, the data of the maximum coding unit may be found useable.

Figure 23:
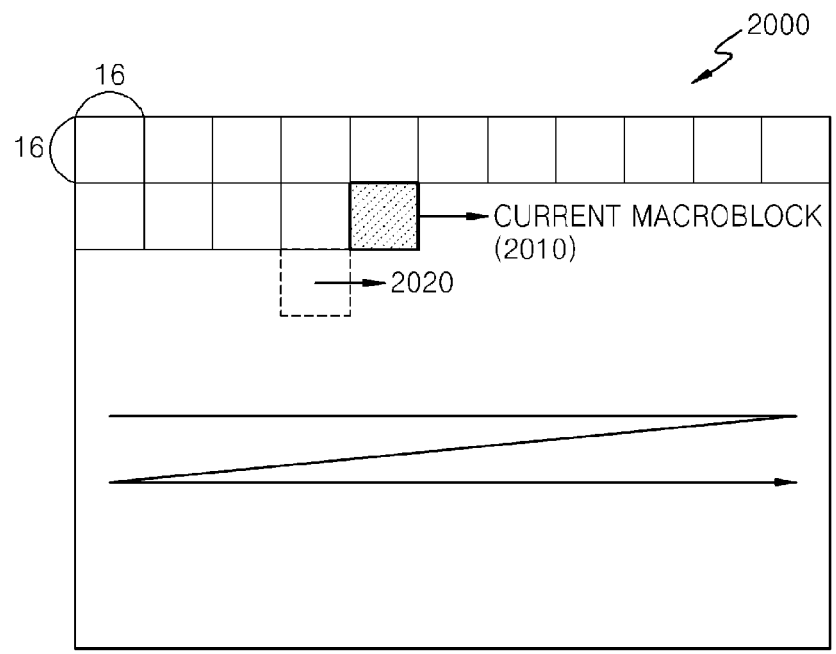
FIG. 23 illustrates macroblocks complying with a raster scanning method.

FIG. 23 illustrates macroblocks complying with a raster scanning method. A related art codec such as H.264 uses macroblocks that each have a maximum size of 16×16 to serve as a unit in which data is encoded. Referring to FIG. 23, although a current macroblock 2010 existing in a picture 2000 may be decoded by referring to neighboring macroblocks existing in the same picture 2000, since macroblocks are decoded in a raster scanning order, a macroblock 2020 located on a left lower side of the current macroblock 2010 has not yet been decoded and thus cannot be referred to by the current macroblock 2010. Hereinafter, when an adjacent data unit cannot be referred to by a current coding unit because it has not yet been decoded, the adjacent data unit is defined to be not useable.

Figure 24:
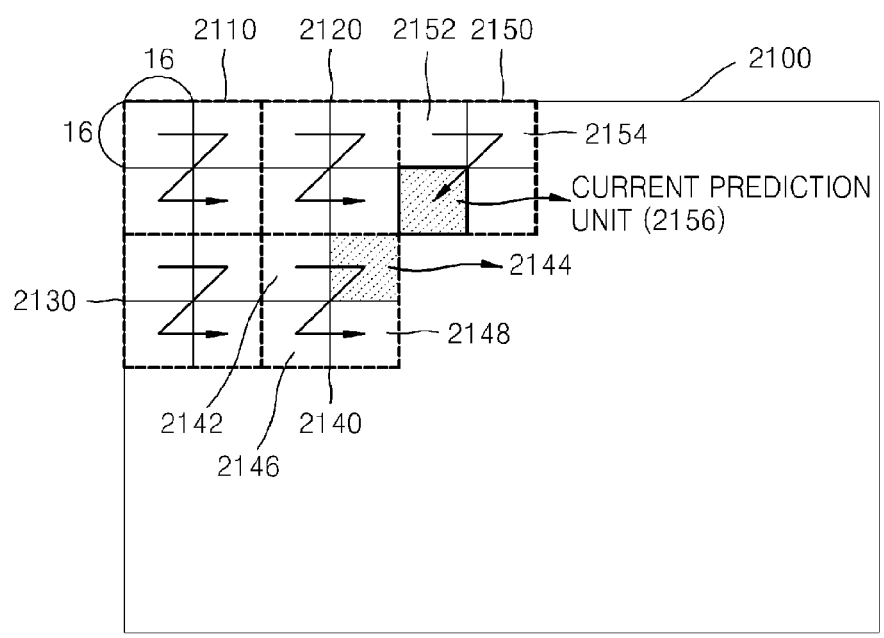
FIG. 24 illustrates a current prediction unit complying with a zigzag scanning order, according to an exemplary embodiment.

FIG. 24 illustrates a current prediction unit 2156 complying with a zigzag scanning order, according to an exemplary embodiment. In an encoding method, since macroblocks are scanned according to a raster scanning method, a second macroblock may not refer to information about a first macroblock scanned later than the second macroblock. However, a video encoding apparatus 100 according to an exemplary embodiment may refer to the first macroblock as neighboring information of the second macroblock in order to encode the second macroblock.

Referring to FIG. 24, taking a picture 2100 as an example, a maximum coding unit having a size of 64×64 is decoded in a zigzag scanning order of coding units 2110, 2120, 2130, and 2140 corresponding to a depth of 1. Furthermore, coding units 2142, 2144, 2146, and 2148 corresponding to a depth of 2 in the coding unit 2140 corresponding to a depth of 1 are also scanned in a zigzag order.

In the zigzag scanning order, after the coding unit 2140 of a depth of 1 is decoded, a coding unit 2150 of a depth of 1 is decoded. Decoding of the coding unit 2150 of a depth of 1 is performed in the order of coding units 2152, 2154, and 2156 corresponding to a depth of 2. Since the coding unit 2144 of a depth of 2 exists on the left lower side of the coding unit 2156 having a depth of 2 and has already been decoded according to the zigzag scanning order, the coding unit 2144 of a depth of 2 may be referred to, as neighborhood information of the coding unit 2156 of a depth of 2. If the coding unit 2156 of a depth of 2 is no longer split to a lower depth, the coding unit 2156 becomes a prediction unit, and the prediction unit 2156 may be prediction-decoded by referring to the coding unit 2144 of a depth of 2.

According to a raster scanning method, the coding unit 2144 is decoded later than the coding unit 2156, and thus information about the coding unit 2144 may not be referred to when decoding the coding unit 2156.

Figure 25:
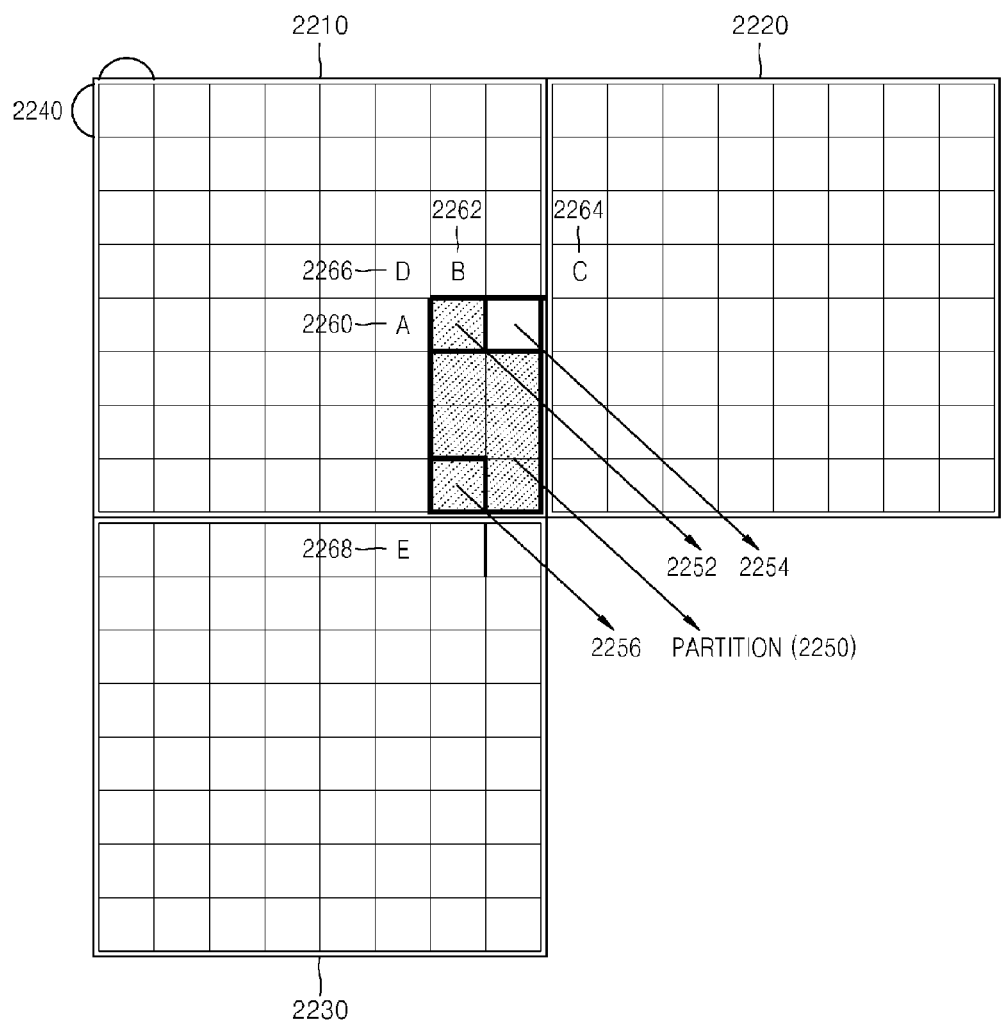
FIG. 25 illustrates minimum units adjacent to a current partition, according to an exemplary embodiment.

FIG. 25 illustrates minimum units adjacent to a current partition, according to an exemplary embodiment. Referring to FIG. 25, maximum coding units 2210, 2220, and 2230 corresponding to a depth of 0 exist, and a minimum coding unit 2240 is set to have a depth of 3. Neighborhood information of a current partition 2250 of a current maximum coding unit 2210 indicates an external minimum unit adjacent to a minimum unit in the current partition 2250.

For example, left neighborhood information, upper neighborhood information, and left upper neighborhood information of the current partition 2250 indicate minimum units 2262, 2260, and 2266 located on a left side, an upper side, and a left upper side of a minimum unit 2256 located on a left upper side of the current partition 2250.

Right upper neighborhood information of the current partition 2250 indicates a minimum unit 2264 located on a right upper side of a minimum unit 2254 located on a right upper side of the current partition 2250. Left lower neighborhood information of the current partition 2250 indicates a minimum unit 2268 located on a left lower side of a minimum unit 2256 located on a left lower side of the current partition 2250.

The image data decoder 230 of a video decoding apparatus 200 according to an exemplary embodiment may check a location and usability of a minimum unit or a maximum coding unit that is adjacent to a current partition. The address of the adjacent minimum unit or the location of the maximum coding unit may be expressed as an index of the minimum unit adjacent to the current partition or an address of a maximum coding unit including the adjacent minimum unit.

In a case other than case (i) where a maximum coding unit is not included in a current picture, case (ii) where a maximum coding unit is not included in a current slice, case (iii) where an address of a maximum coding unit is later than that of a current maximum coding unit in terms of a scanning order, or case (iv) where an index of a minimum unit on a left upper side of a deeper coding unit according to a zigzag scanning order is later than that of a current minimum unit according to a zigzag scanning order in terms of a scanning order, the data of the deeper coding unit may be found usable.

To search for neighborhood information of a current partition, an index of a minimum unit located on a left upper side, a right upper side, or a left lower side within the current partition may be considered, and splitting type information and information about a current depth are used. If all partitions are not the same in size, indices of partitions for a current prediction unit are used.

Figure 26:
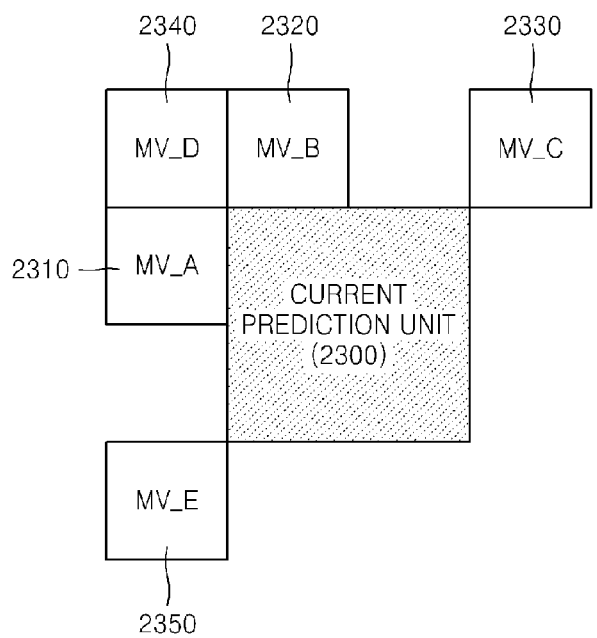
FIG. 26 is a diagram for explaining a motion vector predicting method using neighborhood information, according to an exemplary embodiment.

FIG. 26 is a diagram for explaining a motion vector predicting method using neighborhood information, according to an exemplary embodiment. A video encoding apparatus 100 and a video decoding apparatus 200 according to exemplary embodiments may refer to a motion vector of a prediction unit adjacent to a current prediction unit when performing motion prediction based on an inter mode.

That is, referring to FIG. 26, to predict motion information of a current prediction unit 2300, pieces of motion information MV_A(2310), MV_B(2320), MV_C(2330), MV_D (2340), and MV_E(2350) of prediction units adjacent to the current prediction unit 2300 may be referred to. The motion information pieces MV_A(2310), MV_B(2320), MV_C (2330), MV_D(2340), and MV_E(2350) are neighborhood information of the current prediction unit 2300, i.e., information about prediction units located on a left side, an upper side, a right upper side, a left upper side, and a left lower side of the current prediction unit 2300. The motion information pieces MV_A(2310), MV_B(2320), MV_C(2330), MV_D (2340), and MV_E(2350) may be searched for by using respective encoding information of minimum units of corresponding prediction units.

Figure 27:
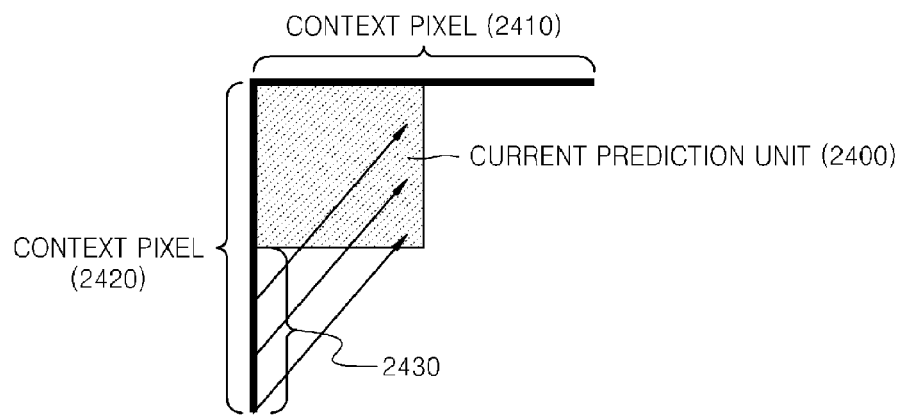
FIG. 27 illustrates an interpolating method using neighborhood information, according to an exemplary embodiment of the present invention.

FIG. 27 illustrates an interpolating method using neighborhood information, according to an exemplary embodiment. A video encoding apparatus 100 and a video decoding apparatus 200 according to exemplary embodiments may refer to a pixel value of a pixel on a boundary of a prediction unit adjacent to a current prediction unit when performing prediction encoding based on an intra mode.

That is, referring to FIG. 27, a pixel value of a current prediction unit 2400 may be predicted by referring to pixel values of pixels on a boundary of data units adjacent to the current prediction unit 2400, i.e., context pixels 2410 and 2420. The context pixel 2430 is neighborhood information of the current prediction unit 2400, i.e., information of pixels located on a left lower side of the current prediction unit 2400.

In a related art codec based on macroblocks complying with a raster scanning order, information about a neighborhood located on a left lower side of a current macroblock, that is, the motion information MV_E(2350) or the context pixel 2430, cannot be used as the neighborhood information.

However, a video encoding apparatus 100 and a video decoding apparatus 200 according to exemplary embodiments may refer to information about a neighborhood located on a left lower side of a current data unit since coding units according to hierarchical depths are encoded and decoded according to a zigzag scanning order. Thus, if the video encoding apparatus 100 and the video decoding apparatus 200 find the information about neighborhood located on the left lower side of the current data unit useable, the video encoding apparatus 100 and the video decoding apparatus 200 may refer to the neighborhood information when encoding or decoding the current data unit.

Figure 28:
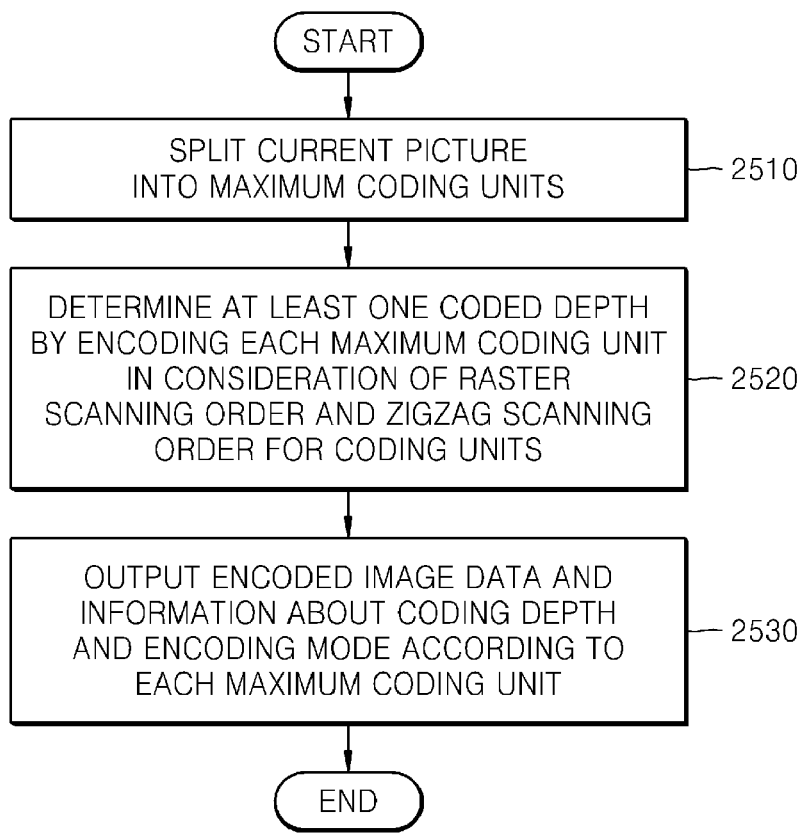
FIG. 28 is a flowchart illustrating a method of encoding a video by using neighborhood information, according to an exemplary embodiment.

FIG. 28 is a flowchart illustrating a method of encoding a video by referring to neighborhood information, according to an exemplary embodiment. Referring to FIG. 28, in operation 2510, a current picture is split into at least one maximum coding unit.

In operation 2520, at least one coded depth is determined by encoding image data corresponding to each maximum coding unit based on coding units hierarchically split as a depth increases, and a coding unit according to a tree structure is determined. The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths. Also, partition types and transformation units having a minimum encoding error are determined for each deeper coding unit. In order to determine a coded depth having a minimum encoding error in each maximum coding unit, encoding errors may be measured and compared in all deeper coding units according to depths.

The image data is encoded in consideration of a raster scanning order among maximum coding units and a zigzag scanning order between deeper coding units included in each of the maximum coding units. The image data may also be encoded by referring to useable neighborhood information in consideration of a scanning order among data units.

In operation 2530, encoded image data of the final encoding result according to the coded depth is output for each maximum coding unit, with encoded information about the coded depth and an encoding mode. The encoded information about the encoding mode may include information about a coded depth or split information, information about a partition type of a prediction unit, a prediction mode, and a size of a transformation unit. The encoded information about the encoding mode may be transmitted to a decoder with the encoded image data.

Figure 29:
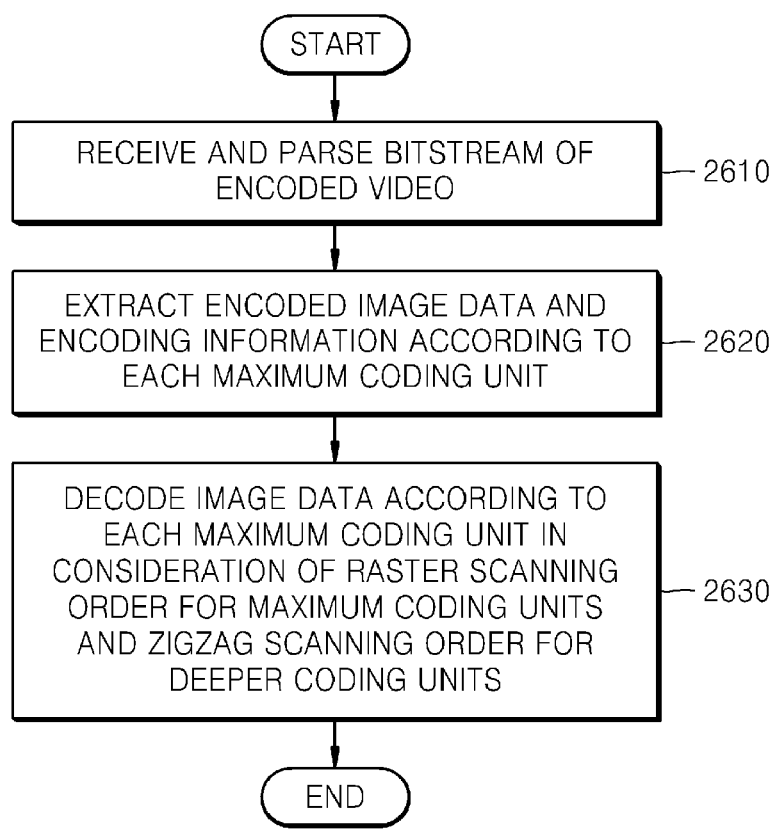
FIG. 29 is a flowchart illustrating a method of decoding a video by using neighborhood information, according to an exemplary embodiment.

FIG. 29 is a flowchart illustrating a method of decoding a video by referring to neighborhood information, according to an exemplary embodiment. Referring to FIG. 29, in operation 2610, a bitstream of an encoded video is received and parsed.

In operation 2620, encoded image data of a current picture assigned to a maximum coding unit is acquired from the parsed bitstream, and information about a coded depth and an encoding mode according to maximum coding units are extracted from the parsed bitstream.

The coded depth of each maximum coding unit is a depth having a minimum encoding error in each maximum coding unit. In encoding each maximum coding unit, the image data is encoded based on at least one data unit obtained by hierarchically splitting each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the minimum encoding error. Accordingly, encoding and decoding efficiency of an image may be improved by decoding each piece of encoded image data in the coding units having a tree structure after determining at least one coded depth according to coding units.

In operation 2530, the encoded image data of each maximum coding unit is decoded in consideration of a raster scanning order among maximum coding units and a zigzag scanning order between deeper coding units included in each of the maximum coding units. Locations of maximum coding units according to a raster scanning order and locations of deeper coding units according to a zigzag scanning order may be searched for, and indices of minimum units according to a zigzag scanning order and indices of minimum units according to a raster scanning order may be mutually transformed to each other.

Usability of neighborhood information may be checked and the neighborhood information may be referred to in order to decode a predetermined coding unit, in consideration of a scanning order of various hierarchical data units, such as a raster scanning order for maximum coding units or prediction units or a zigzag scanning order or a raster scanning order for minimum units. The neighboring information according to an exemplary embodiment may include information about a data unit located on a left lower side of a current data unit.

The decoded image data may be reproduced by a reproducing apparatus, stored in a storage medium, or transmitted through a network according to one or more exemplary embodiments.

Furthermore, one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While exemplary embodiments have been particularly shown and described, it will be understood by those of ordinary skill in the art that various changes in form and details may be made therein without departing from the spirit and scope of the present inventive concept as defined by the appended claims. The exemplary embodiments should be considered in descriptive sense only and not for purposes of limitation. Therefore, the scope of the present inventive concept is defined not by the detailed description of exemplary embodiments, but by the appended claims, and all differences within the scope will be construed as being included in the present inventive concept.

What is claimed is:

1. An apparatus for decoding a video, the apparatus comprising:

an obtainer which obtains, from a bitstream, encoded image data of a plurality of maximum coding units, and split information of coding units in a maximum coding unit of the plurality of maximum coding units; and a decoder which decodes the plurality of maximum coding units according to a raster scanning order, and decodes coding units in the maximum coding unit according to a zigzag scanning order, wherein:

the maximum coding unit is spatially split into the coding units of depths including at least one of a current depth and a lower depth according to the split information, when the split information indicates a split for the current depth, the coding unit of a current depth is split into four coding units of a lower depth, independently from neighboring coding units, when the split information indicates a non-split for the lower depth, one or more prediction units are obtained from a coding unit of the lower depth, the zigzag scanning order on the four coding units of the lower depth is a same order as the raster scanning order on the four coding units.

2. The apparatus of claim 1, wherein the decoder refers to neighborhood information by checking usability of the neighborhood information, in consideration of a scanning order of the maximum coding unit, and coding units having same coded depth included in the maximum coding unit.

3. The apparatus of claim 1, wherein the decoder checks usability of the coding units of the maximum coding unit.

* * * * *